United States Patent

Emi et al.

[11] Patent Number: 5,991,558
[45] Date of Patent: Nov. 23, 1999

[54] IMAGE FORMING APPARATUS THAT CONTROL THE REFLECTED LIGHT DETECTED BY AN OPTICAL SCANNER IN RESPONSE TO A GRADATION AREA PERCENTAGE OF A TONER PATCH

[75] Inventors: Mariko Emi; Shigeru Tsukada; Satoshi Tomita, all of Ebina, Japan

[73] Assignee: Fuji Xerox Co., Ltd., Tokyo, Japan

[21] Appl. No.: 09/047,452

[22] Filed: Mar. 25, 1998

[30] Foreign Application Priority Data

Mar. 27, 1997 [JP] Japan .................................. 9-074749
Feb. 20, 1998 [JP] Japan ................................. 10-038213

[51] Int. Cl.$^6$ .................................................. G03G 15/00
[52] U.S. Cl. ............................... 399/49; 399/58; 399/59; 399/60
[58] Field of Search ............................ 399/49, 46, 41, 399/40, 42, 60, 58, 64, 65; 358/406, 458, 504, 519, 521

[56] References Cited

U.S. PATENT DOCUMENTS 5,436,705  7/1995  Raj ............................................ 399/59
5,574,544  11/1996  Yoshino et al. ........................... 399/60
5,583,644  12/1996  Sasanuma et al. ..................... 399/72 X
5,682,573  10/1997  Ishikawa et al. ...................... 399/49 X
5,812,903  9/1998  Yamada et al. ........................ 399/49 X

FOREIGN PATENT DOCUMENTS 4-146459  5/1992  Japan .

Primary Examiner—Arthur T. Grimley
Assistant Examiner—Hoan Tran
Attorney, Agent, or Firm—Oliff & Berridge, PLC

[57] ABSTRACT

An image forming apparatus that prepares a toner patch including a predetermined gradation area percentage on an image support to detect a developing concentration. An optical sensor detects reflected light from the background of the image support and reflected light from the toner patch prepared on the image support. The reflected light detected by the optical sensor is then controlled in response to the gradation area percentage of the prepared toner patch.

27 Claims, 23 Drawing Sheets

FIG. 4A
(FOR COLOR TONER)
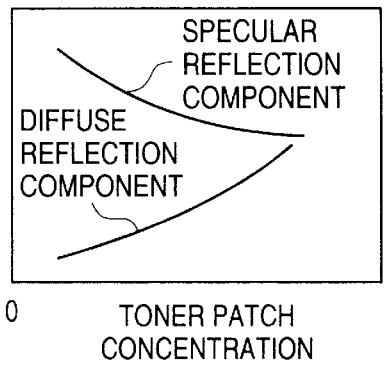 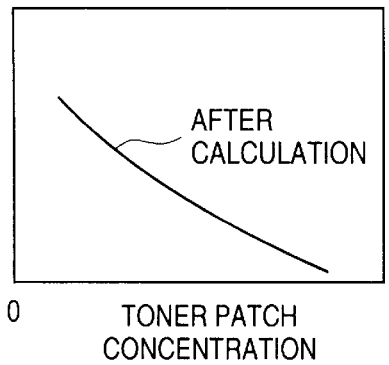
FIG. 4B
(FOR BLACK TONER)
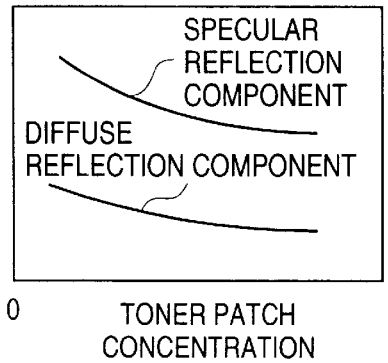 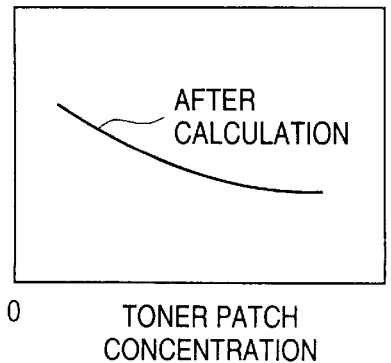

FIG. 7

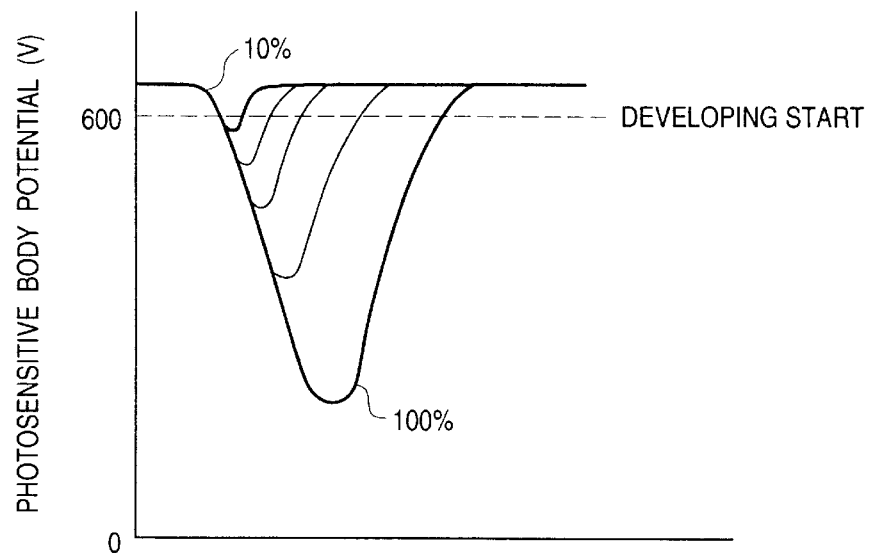

FIG. 8

| TONER CONCEN-TRATION | GROUND READ METHOD | TONER PATCH READ METHOD |
|---|---|---|
| 20% OR LESS | GROUND AT THE SAME POSITION AS TONER PATCH PREPARATION POSITION IS READ FIVE TIMES AT 3 msec INTERVALS FOR EACH JOB ($t_1$ IN FIG. 10) AND AVERAGE $V_{C1}$ IS CALCULATED. | TONER PATCH AT THE SAME POSITION AS THE BACKGROUND READ POSITION IS READ FIVE TIMES AT 3 msec INTERVALS ($t_1$), AVERAGE $V_P$ IS CALCULATED, AND ($V_P/V_{C1}$) x 200 IS CALCULATED TO FIND TONER PATCH CONCENTRATION DETECTION VALUE. |
| EXCEEDING 20% | ONE ROUND OF PHOTORECEPTOR IS READ AT 3 msec INTERVALS ($t_2$) AND AVERAGE $V_{C0}$ IS CALCULATED. $V_{C0}$ IS READ ONLY ONCE AT THE SHIPMENT TIME OF THE MACHINE (OR EACH TIME THE MACHINE IS STARTED). | TONER PATCH AT THE SAME POSITION AS THAT WHEN $C_{in}$ IS 20% OR LESS IS READ FIVE TIMES AT 3 msec INTERVALS ($t_1$), AVERAGE $V_P$ IS CALCULATED, AND ($V_P/V_{C0}$) x 200 IS CALCULATED TO FIND TONER PATCH CONCENTRATION DETECTION VALUE. |

FIG. 16

| TONER CONCEN-TRATION | GROUND READ METHOD | TONER PATCH READ METHOD |
|---|---|---|
| 20% OR LESS | ONE ROUND OF PHOTOSENSITIVE BODY IS READ AT 3 msec INTERVALS (t2) AS Vc1, AND DETECTION POSITIONS AND DETECTION VALUES ARE STORED IN CORRESPONDENCE WITH ADDRESSES. DETECTION POSITION AND DETECTION VALUE AT THE POSITION AT THE GROUND READ TIME ARE USED AT THE CALCULATION TIME. | TONER PATCH IS READ FIVE TIMES AT 3 msec INTERVALS (t1), AVERAGE Vp IS CALCULATED, AND (Vp/Vc1) x 200 IS CALCULATED TO FIND TONER PATCH CONCENTRATION DETECTION VALUE. |
| EXCEEDING 20% | ONE ROUND OF PHOTOSENSITIVE BODY IS READ AT 3 msec INTERVALS (t2) AND AVERAGE Vco IS CALCULATED. Vco IS READ ONLY ONCE AT THE SHIPMENT TIME OF THE MACHINE (OR EACH TIME THE MACHINE IS STARTED). | TONER PATCH AT THE SAME POSITION AS THAT WHEN Cin IS 20% OR LESS IS READ FIVE TIMES AT 3 msec INTERVALS (t1), AVERAGE Vp IS CALCULATED, AND (Vp/Vco) x 200 IS CALCULATED TO FIND TONER PATCH CONCENTRATION DETECTION VALUE. |

FIG. 17

| ADDRESS | POSITION | SENSOR OUTPUT (GROUND DETECTION VALUE) |
|---|---|---|
| 0 0 0 | 0 | 1.901 |
| 0 0 1 | 1 | 1.897 |
| . | . | . |
| . | . | . |
| . | . | . |
| . | . | . |
| . | . | . |
| 9 9 9 | 9 9 9 | 1.905 |

FIG. 19

| TONER CONCEN-TRATION | GROUND READ METHOD | TONER PATCH READ METHOD |
|---|---|---|
| 20% OR LESS | GROUND AT THE SAME POSITION AS TONER PATCH PREPARATION POSITION IS READ FIVE TIMES AT 3 msec INTERVALS FOR EACH JOB ($t_1$ in FIG. 4) AND AVAERAGE $V_{C1}$ IS CALCULATED. | TONER PATCH AT THE SAME POSITION AS THE GROUND READ POSITION IS READ FIVE TIMES AT 3 msec INTERVALS ($t_1$), AVERAGE $V_P$ IS CALCULATED, AND $(V_P/V_{C1}) \times 200$ IS CALCULATED TO FIND TONER PATCH CONCENTRATION DETECTION VALUE. |
| EXCEEDING 20% | ONE ROUND OF PHOTOSENSITIVE BODY IS READ AT 3 msec INTERVALS ($t_2$) AND AVERAGE $V_{C0}$ IS CALCULATED. $V_{C0}$ IS READ ONLY ONCE AT THE SHIPMENT TIME OF THE MACHINE (OR EACH TIME THE MACHINE IS STARTED). | TONER PATCH AT ANY POSITION OF PHOTOSENSITIVE BODY IS READ 10 TIMES AT 3 msec INTERVALS ($t_3$), AVERAGE $V_P$ IS CALCULATED, AND $(V_P/V_{C0}) \times 200$ IS CALCULATED TO FIND TONER PATCH CONCENTRATION DETECTION VALUE. |

FIG. 20

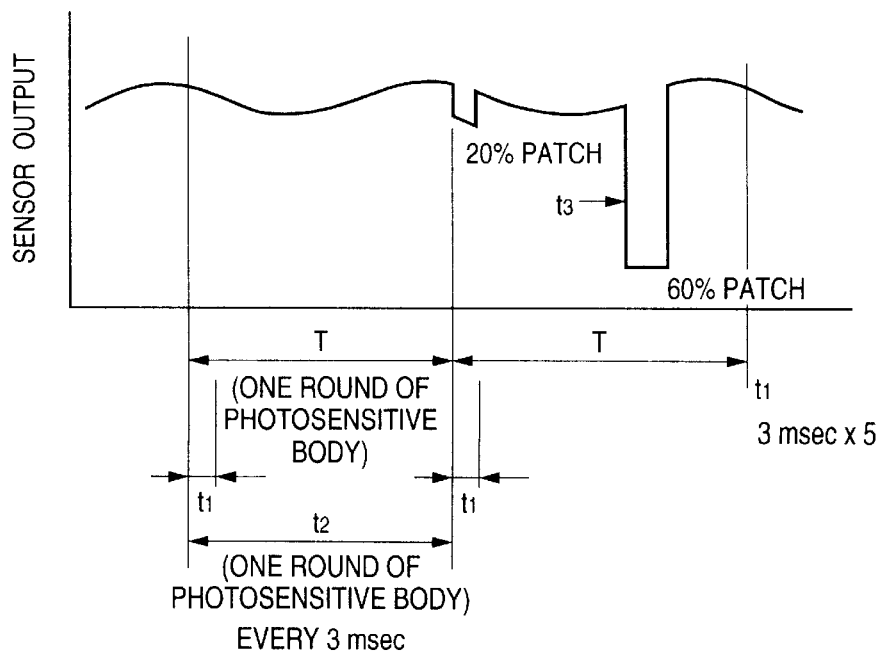

FIG. 22

| | EXPRESSION | | LOOK-UP TABLE | |
|---|---|---|---|---|
| Cin | Kn | KALL | Kn | KALL |
| 0 % | 1.0 | 0 | 1.0 | 0 |
| 10 | 0.9 | 0.1 | 0.85 | 0.15 |
| 20 | 0.8 | 0.2 | 0.7 | 0.3 |
| 30 | 0.7 | 0.3 | 0.55 | 0.45 |
| 40 | 0.6 | 0.4 | 0.5 | 0.5 |
| 50 | 0.5 | 0.5 | 0.25 | 0.75 |
| 60 | 0.4 | 0.6 | 0.1 | 0.9 |
| 70 | 0.3 | 0.7 | 0.05 | 0.95 |
| 80 | 0.2 | 0.8 | 0 | 1.0 |
| 90 | 0.1 | 0.9 | 0 | 1.0 |
| 100 | 0 | 1.0 | 0 | 1.0 |

FIG. 23

| TONER CONCENTRATION | TONER PATCH PREPARATRION FREQUENCY |
|---|---|
| 20% OR LESS | ONCE EVERY 10 COPIES AT CONTINUOUS COPY TIME |
| EXCEEDING 20% | ONCE EVERY FIVE COPIES AT CONTINUOUS COPY TIME |

FIG. 24

| NUMBER OF COPY SHEETS IN JOB | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| 20% TONER PATCH | ○ | | | | | | | | | ○ | | | | | | | | | | ○ |
| 60% TONER PATCH | ○ | | | | ○ | | | | | ○ | | | | | ○ | | | | | ○ |

IMAGE FORMING APPARATUS THAT CONTROL THE REFLECTED LIGHT DETECTED BY AN OPTICAL SCANNER IN RESPONSE TO A GRADATION AREA PERCENTAGE OF A TONER PATCH

BACKGROUND OF THE INVENTION

This invention relates to an image forming apparatus for detecting toner concentration and stably controlling the toner concentration, such as a copier or a laser printer, and a control method of the image forming apparatus.

An image forming apparatus, for example, a color copier has a configuration as shown in FIG. 30 and comprises a photoelectric sensor 30 for detecting a toner image consisting of percentage of image coverage prepared on a photoreceptor 10 to stably control a toner concentration transferred to recording paper.

The photoelectric sensor 30 used is a photoelectric sensor for detecting specular reflection light on the surface of the photoreceptor 10 as shown in FIG. 31, a sectional view, or a photoelectric sensor for detecting diffuse reflection light (not shown).

FIG. 32 shows the relationship between the concentration of a toner patch image (test toner image) and sensor output voltage when the photoelectric sensor for detecting specular reflection light is used. As shown here, to use the photoelectric sensor for detecting specular reflection light, when the toner patch concentration is high regardless of black toner or color toner, the sensor output voltage lowers. However, for the color toner, if the toner patch concentration becomes high exceeding a saturation point, the sensor output voltage rises, because diffuse reflection light increases and enters the photoelectric sensor.

Normally, honing treatment is applied to the surface of a photoreceptor to avoid interference fringes of laser light. As shown in FIG. 33, when the photoelectric sensor gets reflected light on the photoreceptor surface, the sensor output voltage is a state in which fine reflection unevenness is largely undulated. That is, the sensor output voltage becomes a state in which fine reflection unevenness caused by the surface state of the honing treatment is undulated by large reflection unevenness caused by vibration at the rotation time of the photoreceptor or the photoreceptor surface working effect.

With a color copier, sensor output voltage fluctuation of the photoelectric sensor caused by the large undulated reflection unevenness of the two types of reflection unevenness causes a problem in stably controlling the toner concentration transferred to recording paper.

The Unexamined Japanese Patent Application Publication No. Hei 4-146459 discloses an art of measuring the sensor output voltages of photoreceptor background, a test toner image at saturation level, and a halftone test toner image by a photoelectric sensor for detecting diffuse reflection light, calculating a developing bias voltage from the measurement values, and feeding back the calculated developing bias voltage to a developing bias power supply unit.

In this art, the measurement timings of the reflected light quantity on the photoreceptor background, the reflected light quantity on the test toner image at the saturation level, and the reflected light quantity on the halftone test toner image by the photoelectric sensor are matched with the rotation cycle of the photoreceptor to avoid the sensor output fluctuation effect of the photoelectric sensor caused by reflection unevenness on the photoreceptor caused by a roundness error, an eccentricity error, or the like on manufacturing the photoreceptor.

The difference between the photoelectric sensor for detecting specular reflection light and the photoelectric sensor for detecting diffuse reflection light is that the sensor output voltage of the latter photoelectric sensor rises when the toner concentration of black toner or color toner is high as the phase of the sensor output voltage responding to the toner concentration is inverted.

However, the reflected light quantity from a toner image is affected by reflection unevenness on the background of a photoreceptor depending on the concentration of the toner image. Considering how the light quantity is affected by reflection unevenness, as shown in FIG. 34, the sensor output voltage is truly affected by reflection unevenness on the background of a photoreceptor at 20% toner patch concentration and has undulation similar to that caused by reflection unevenness on the background, but is little affected by reflection unevenness on the background of the photoreceptor at 60% toner patch concentration and thus little changes.

In the art disclosed in the Unexamined Japanese Patent Application Publication No. Hei 4-146459, the sensor output fluctuation effect of the photoelectric sensor caused by reflection unevenness on the photoreceptor caused by a roundness error, an eccentricity error, or the like on manufacturing the photoreceptor is avoided, but the reflected light quantity is affected by reflection unevenness on the background of the photoreceptor depending on the toner patch concentration. Therefore, an error occurs between the measurement value of the photoelectric sensor when the toner patch concentration is low and the effect of reflection unevenness on the background is received and that when the toner patch concentration is high and the effect of reflection unevenness on the background is not received.

SUMMARY OF THE INVENTION

It is therefore an object of the invention to provide an image forming apparatus to solve the problems. The image forming apparatus of the invention comprises patch preparation means for preparing a toner patch including a predetermined percentage of image coverage on an image support to detect a developing concentration, an optical sensor for detecting reflected light from the background of the image support and reflected light from the toner patch prepared on the image support, and control means for controlling a reflected light detection method of the optical sensor in response to the gradation area percentage of the toner patch prepared by the patch preparation means.

In the invention, the patch preparation means prepares a toner patch including a predetermined gradation area percentage and the control means controls the detection method of the reflected light from the prepared toner patch and the reflected light from the background of the image support in response to the gradation area percentage of the prepared toner patch. Thus, a reflected light detection error of the optical sensor can be suppressed in response to the relationship between the toner patch concentration and reflection unevenness from the background of the image support.

According to the invention, there is provided on image forming apparatus control method comprising the steps of detecting reflected light from a background of an image support according to a detection method responsive to gradation area percentage of a toner patch, preparing a toner patch including a predetermined gradation area percentage on the image support at predetermined timing, detecting reflected light from the toner patch according to the detection method responsive to the gradation area percentage of the toner patch, and controlling the developing concentration based on the operation result on the detection values of the reflected light from the background of the image support and the reflected light from the toner patch.

In the control method, the reflected light from the background of the image support and the reflected light from the toner patch prepared on the image support are detected according to the detection method responsive to the gradation area percentage of the toner patch. Thus, a reflected light detection error can be suppressed in response to the relationship between the toner patch concentration and reflection unevenness from the background of the image support, and the developing concentration can be controlled with good accuracy.

BRIEF DESCRIPTION OF THE DRAWINGS

In the accompanying drawings:

FIGS. 4A and 4B are graphs to show output of the photoelectric sensor shown in FIG. 2;

FIG. 7 is an illustration to show latent image shape on a photoreceptor;

FIG. 8 is a table to explain first embodiment of the invention;

FIG. 16 is a table to explain a modified example of the first embodiment of the invention;

FIG. 17 is an illustration to explain a storage state in a memory;

FIG. 19 is a table to explain a second embodiment of the invention;

FIG. 20 is an illustration to explain sensor output (No.2);

FIG. 22 is an illustration to explain a look-up table;

FIG. 23 is a table to explain a third embodiment of the invention;

FIG. 24 is a table to explain toner patch preparation frequencies;

DETAILED DESCRIPTION OF THE PREFERRED EMBODIMENTS

Figure 1:
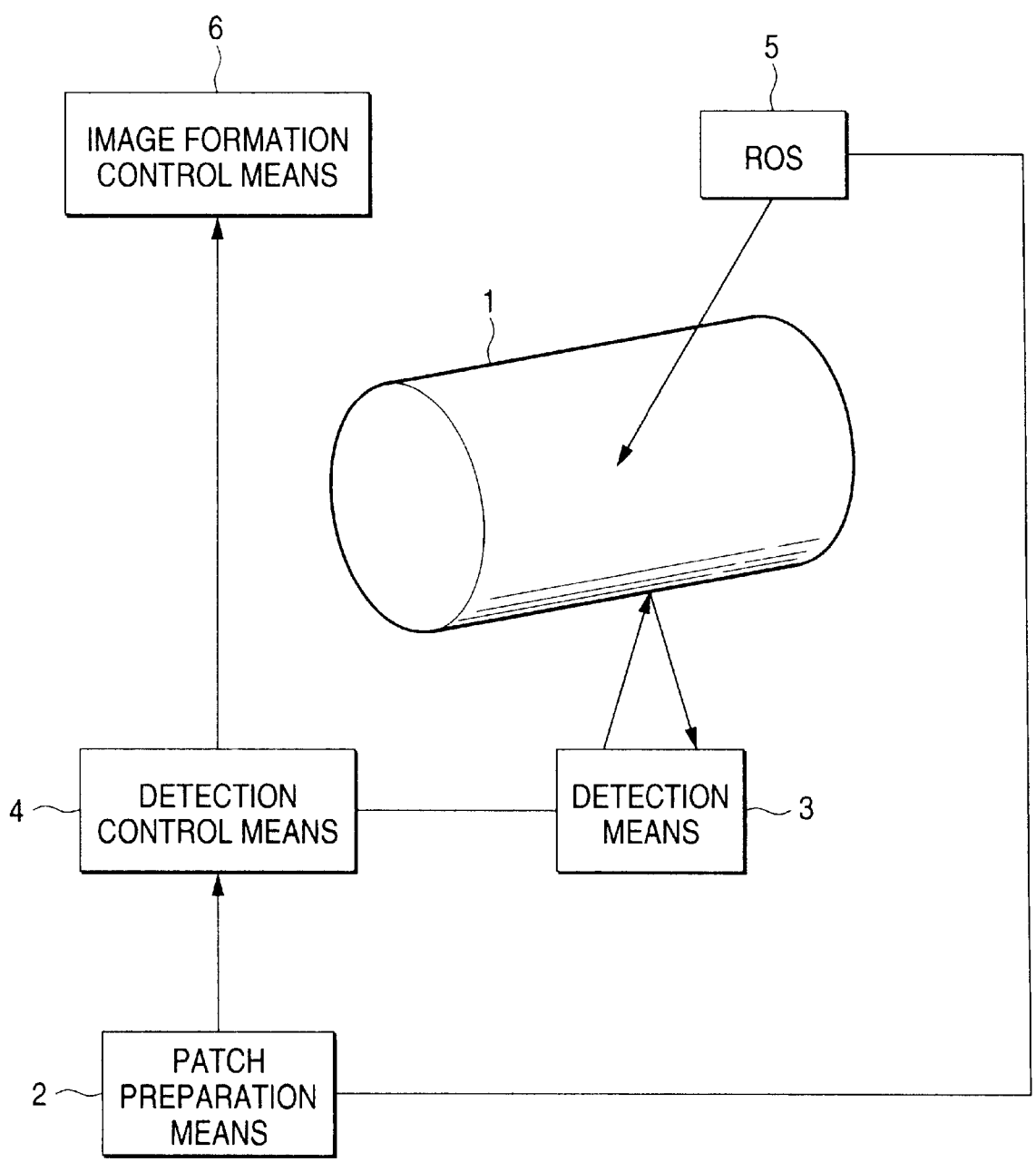
FIG. 1 is a block diagram to explain an image forming apparatus of embodiment of the invention.

Referring now to the accompanying drawings, there are shown preferred embodiments of an image forming apparatus of the invention. FIG. 1 is a block diagram to explain an image forming apparatus in embodiment. The image forming apparatus comprises patch preparation means 2 for determining gradation area percentage of a toner patch, which will be hereinafter referred simply as Cin, developed on a photoreceptor 1 of an image support, detection means 3 made of a photoelectric sensor for detecting reflected light from the background of the photoreceptor 1 and reflected light from the toner patch, detection control means 4 for controlling a reflected light detection method in the detection means 3 in response to the Cin determined by the patch preparation means 2, an ROS (Raster Output Scanner) 5 for preparing an electrostatic latent image for preparing a toner image on the photoreceptor 1 in response to an instruction from the patch preparation means 2, and image forming control means 6 for controlling tone reproduction control, toner concentration, etc.

The image forming apparatus in the embodiment is characterized by the fact that a background read method of the photoreceptor 1 and a toner patch read method by the detection means 3 are changed in response to the Cin of a toner patch prepared on the photoreceptor 1, for example, by assuming 20% or less Cin to be low Cin and any other Cin to be high Cin.

Figure 2:
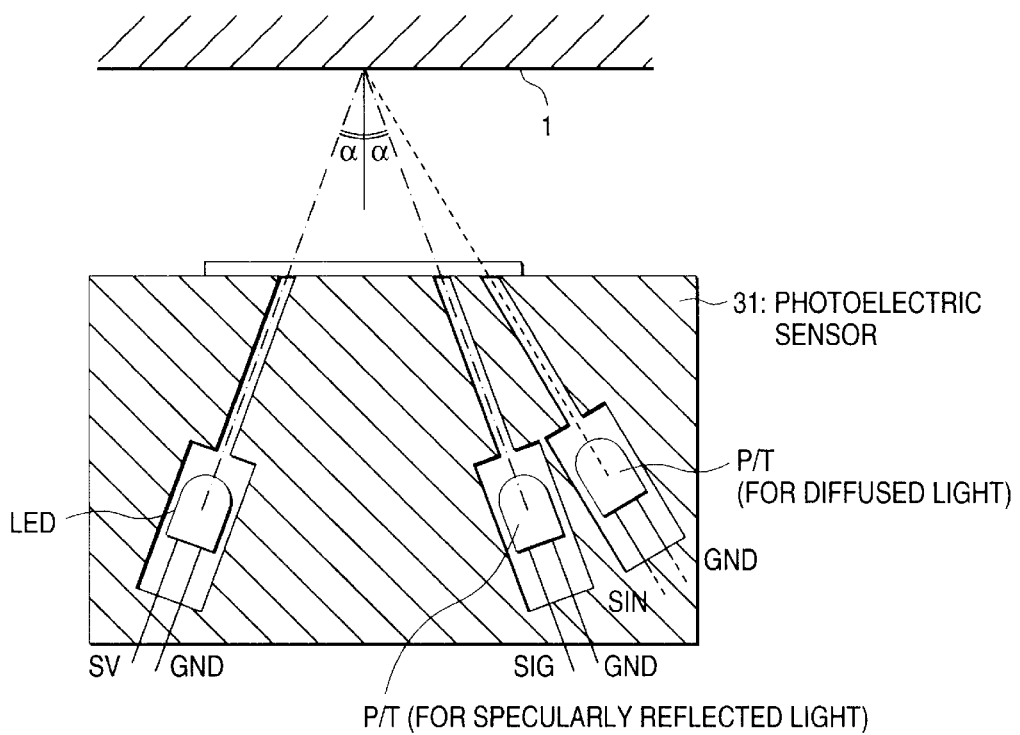
FIG. 2 is a sectional view to explain a photoelectric sensor using two types of photoelectric sensors in combination.
Figure 3:
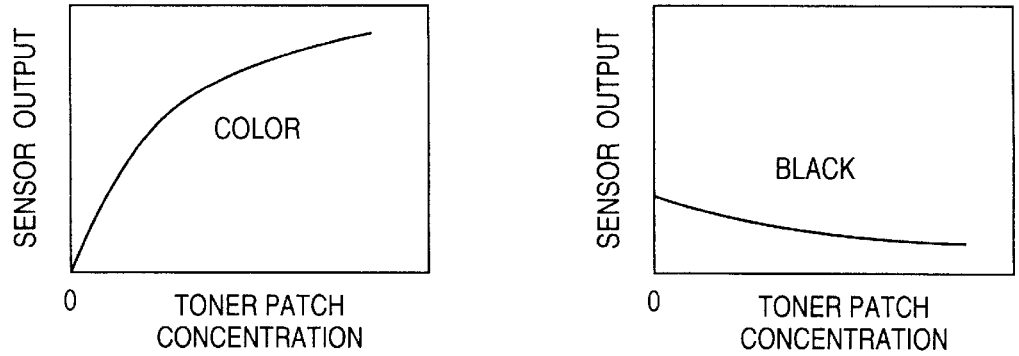
FIGS. 3A and 3B are graphs to show diffuse reflection type sensor output.
Figure 32:
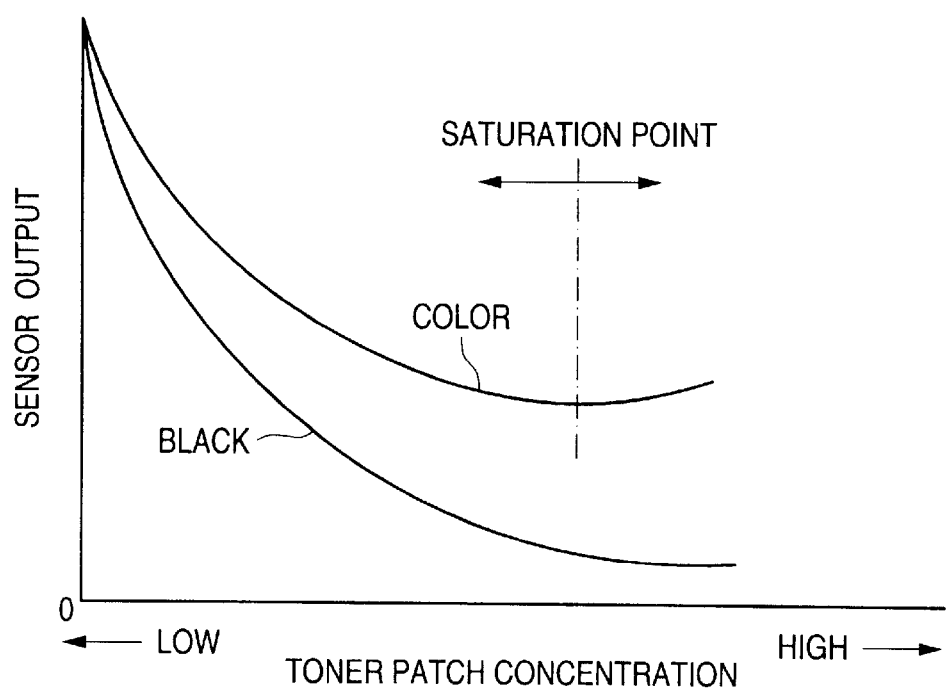
FIG. 32 is a graph to show sensor output at the specular reflection.
Figure 33:
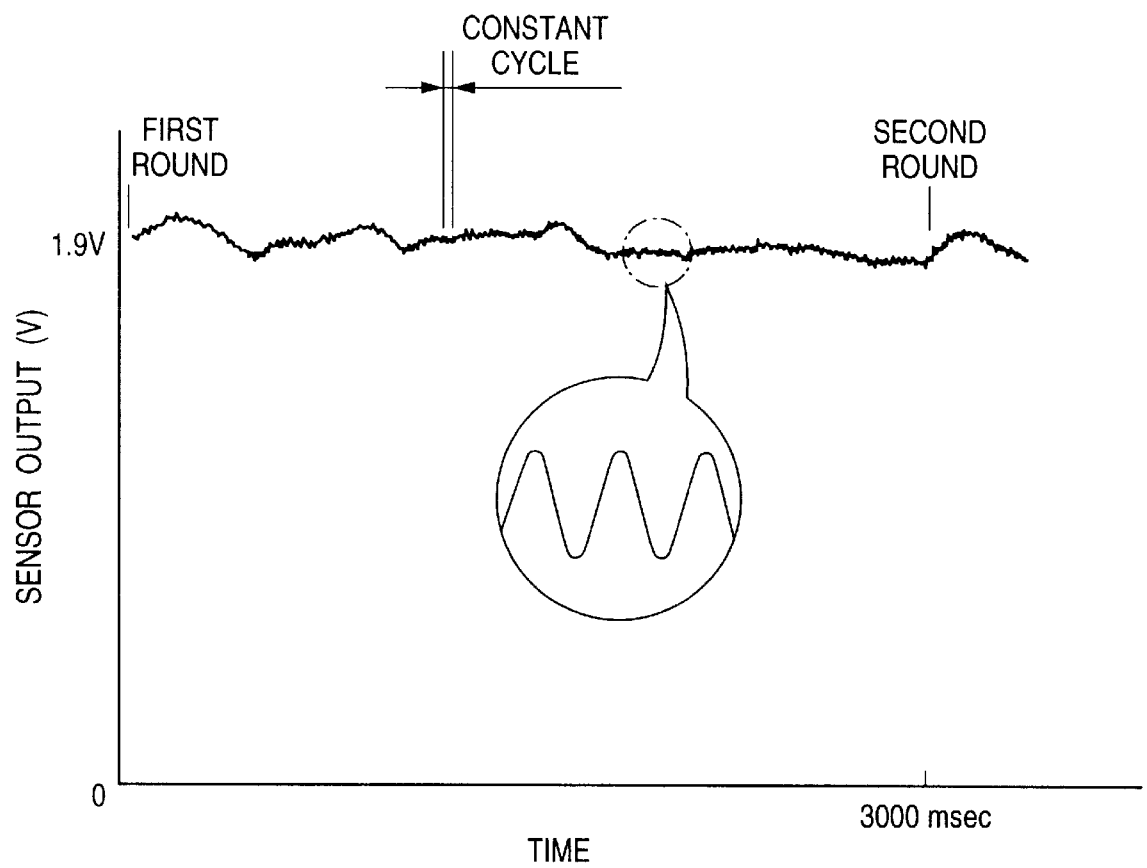
FIG. 33 is an illustration to explain reflection factor unevenness on a photoreceptor surface.
Figure 34:
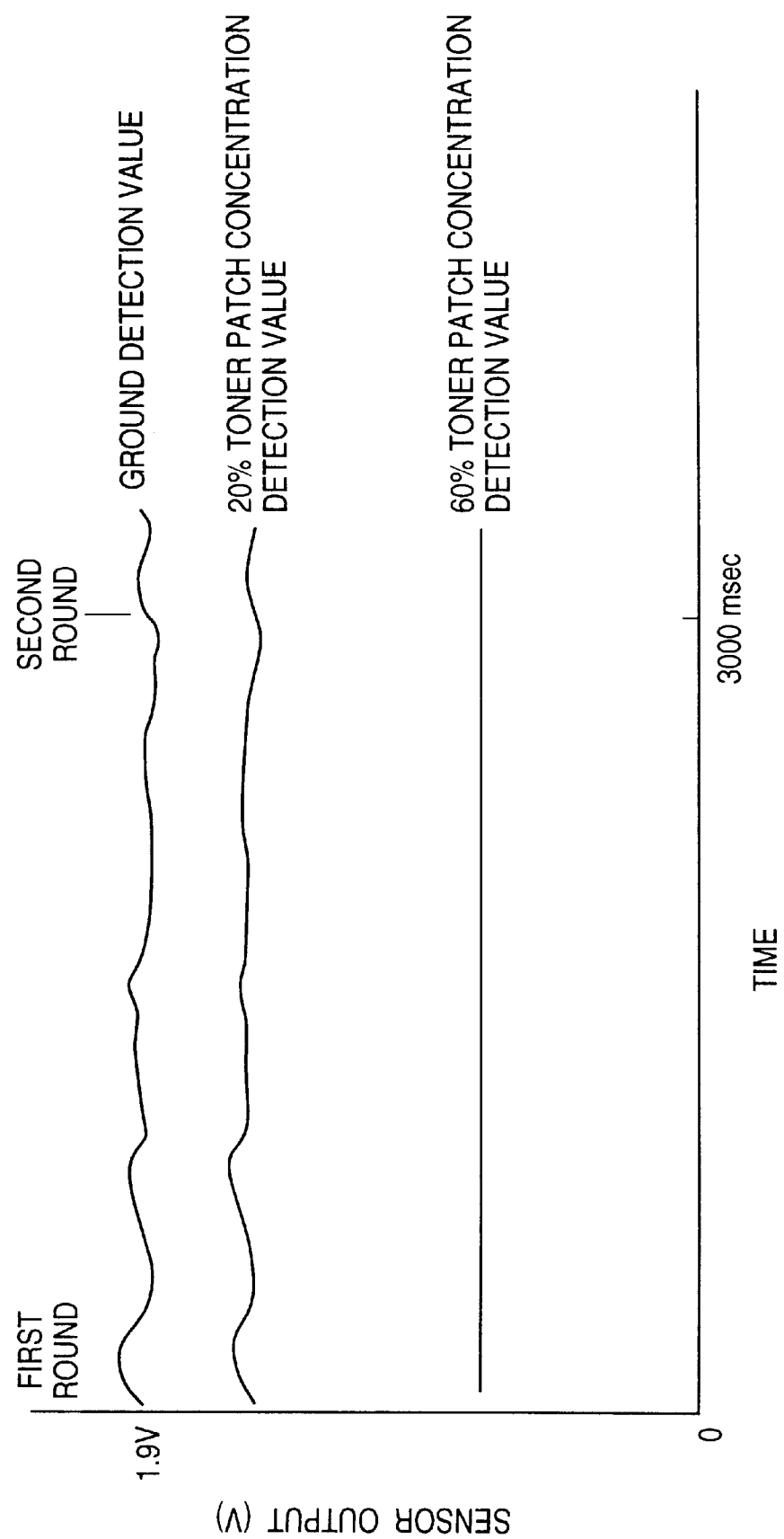
FIG. 34 is a graph to show the effect of background according to Cin.

The detection means 3 used with the image forming apparatus may be a photoelectric sensor of specular reflection type, a photoelectric sensor of diffuse reflection type, or a combination thereof 31 as shown in FIG. 2. The photoelectric sensor of specular reflection type has sensor output saturated as shown in FIG. 32. Particularly for color toner, saturation starts fast and thus high concentration cannot be detected. On the other hand, the photoelectric sensor of diffuse reflection type can detect low to high concentrations without saturation with color toner. Since diffused light little exists with black toner, output less changes than that with color toner.

Further, the photoelectric sensor 31 using photoelectric sensors of specular and diffuse reflection types in combination as shown in FIG. 2 can detect high concentration by subtracting a diffuse reflection component from a specular reflection component as shown in FIG. 4. That is, when specular reflection is detected, the diffuse reflection component is entered and thus is removed by calculation, whereby high sensitivity can be provided. FIG. 4A shows sensor output for color toner and FIG. 4B shows sensor output for black toner; the right graphs show sensor output after calculation.

Figure 5:
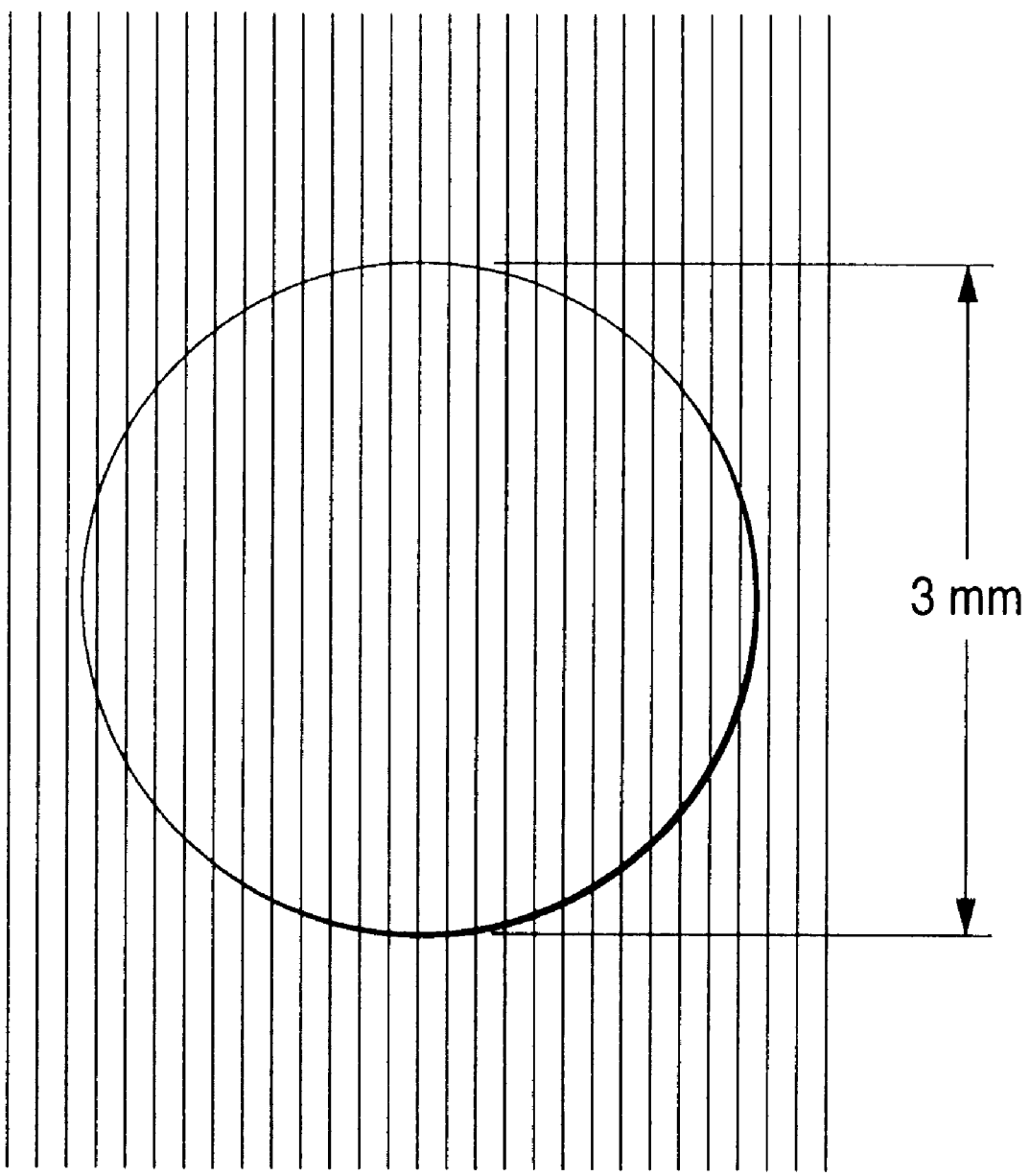
FIG. 5 is an illustration to show the relationship between a sensor sensing area and the number of lines of a toner patch.

In any of the photoelectric sensors, the size (diameter (detection area)) of light applied to the photoreceptor 1 from a light emitting diode (LED) (wavelength 970 nm) is 3 mm in diameter on the detection face as indicated by the circle in FIG. 5, containing a large number of lines making up a toner patch. For example, 23.6 lines are contained at the 200-line screen time.

A toner patch is made up of the number of toner lines formed in a predetermined area, the line thickness, and the number of dots. The Cin where the effect of the background of a photoreceptor at the detection time of a photoelectric sensor is not received varies depending on the toner patch type. Thus, in the embodiment, the detection contribution percentage at reflected light on the background of a photoreceptor is changed according to the toner patch type for suppressing a detection error (described later).

Figure 6:
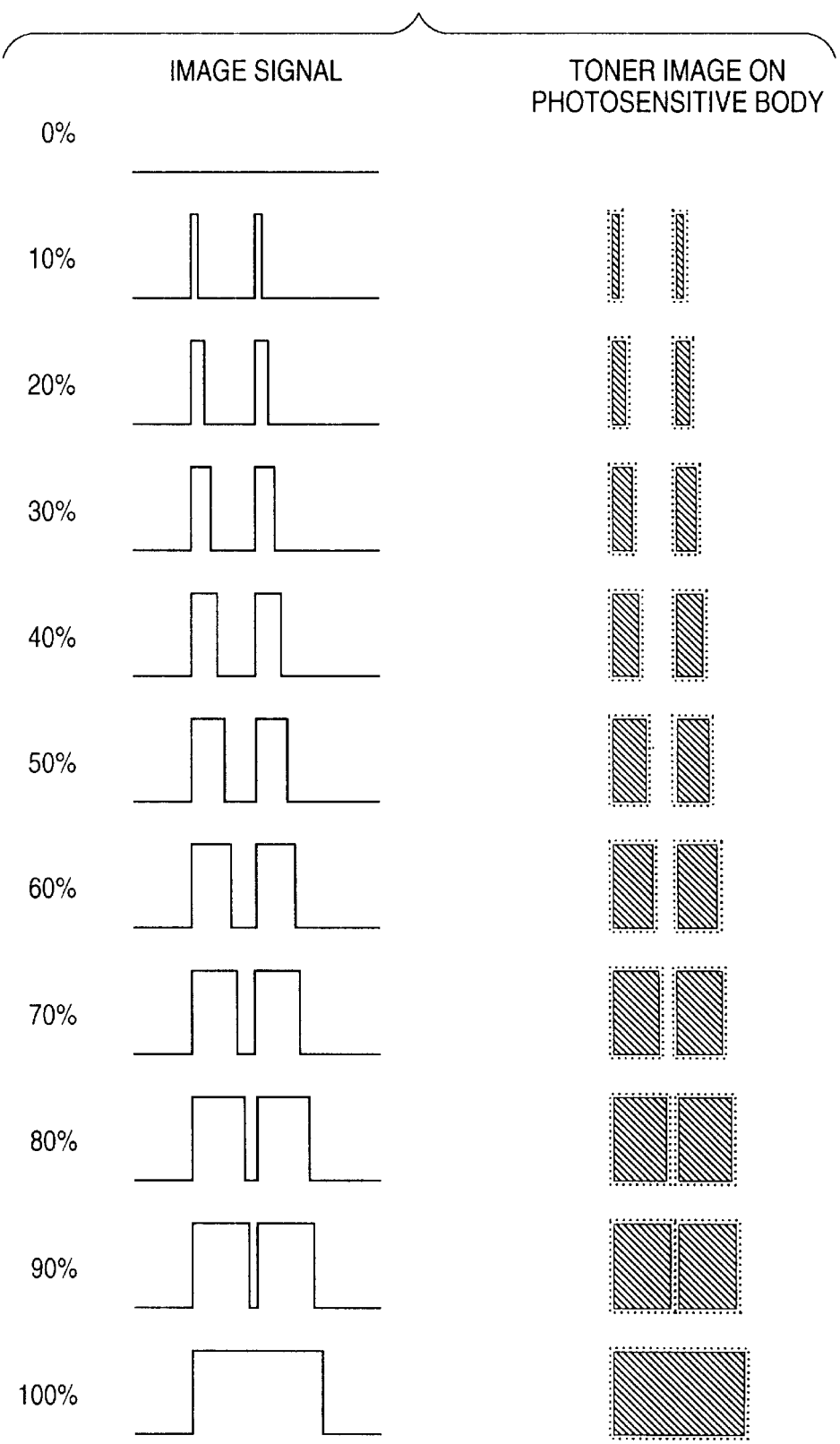
FIG. 6 is an illustration to show the relationship between image signals and toner images.

Here, a linear toner patch will be discussed. FIG. 6 is an illustration to show the relationship between image signals (10% units from 0% to 100%) on 200 lines of a screen and toner images on a photoreceptor corresponding the image signals. As shown here, the image signal becomes 70%, the toner image on the photoreceptor have some lines concatenated. This is caused by the latent image shape effect by ROS shown in FIG. 7.

Control of a reflected light detection method in the detection means 3, namely, detection method control in the detection control means 4 in response to Cin will be discussed. FIG. 8 is a table to explain first embodiment. In the first embodiment, the background read method of the photoreceptor and the toner patch read method are changed in response to the Cin detected by the detection means 3, namely, depending on whether the Cin is 20% or less or exceeds 20%. The detection values are averaged and the toner patch concentration in each Cin can be detected with good accuracy according to the ratio between the background detection average and the toner patch detection average. Tone reproduction control, toner concentration control, and the like of the image forming apparatus are performed based on the detection result, whereby the concentration in the image forming apparatus such as a color copier can be controlled with high accuracy even according to detection of a photoelectric sensor at low cost.

In the first embodiment, when Cin is 20% or less, the background at the same position as the toner patch preparation position is read five times at 3-msec intervals for each job (image formation request) (time t1) and average Vc1 is calculated as the background read method. As the toner patch read method, toner patch at the same position as the background read position is read five times at 3-msec intervals (time t1), average Vp is calculated, and (Vp/Vc1)×200 is calculated to find a toner patch concentration detection value. Since the LED of a light emitting element and P/T of a light receiving element have temperature dependency, the ratio is found, whereby the effect can be eliminated. Multiplication by 200 is executed to convert into 8-bit data (0–255) and prevent an overflow from occurring in the calculation.

On the other hand, when Cin exceeds 20%, as the background read method, one round of the photoreceptor is read at 3-msec intervals (time t2) and average Vc0 is calculated. The Vc0 is read only once at the shipment time of the image forming apparatus (or each time the image forming apparatus is started). That is, the background read position when Cin exceeds 20% is only changed from that when Cin is 20% or less. As the toner patch read method, toner patch at the same position as that when Cin is 20% or less is read five times at 3-msec intervals (time t1), average Vp is calculated, and (Vp/Vc0)×200 is calculated to find a toner patch concentration detection value.

Figure 9A:
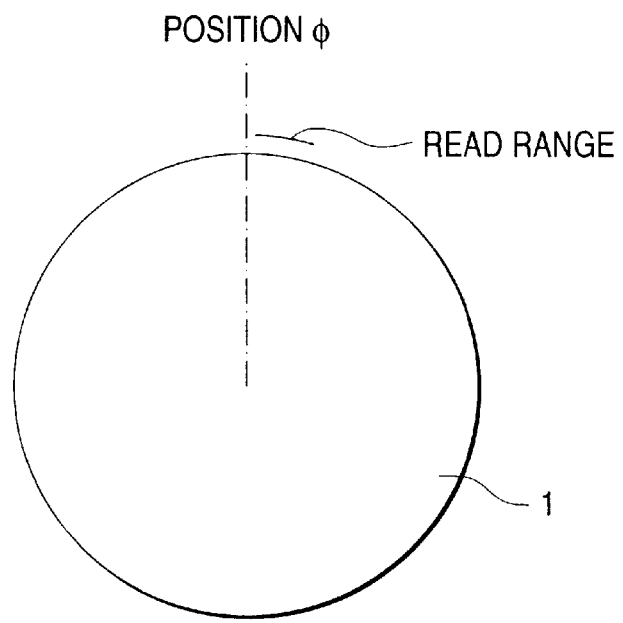
FIGS. 9A and 9B are illustrations to explain read positions.
Figure 9B:
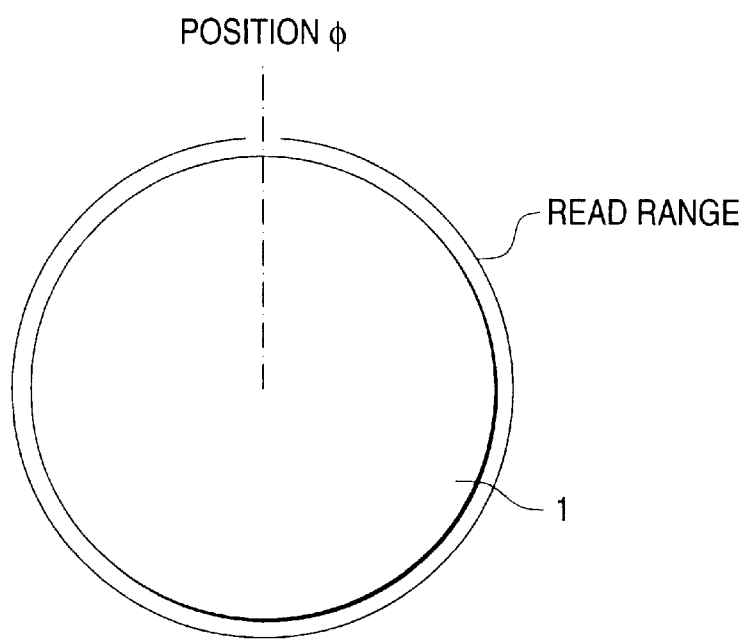

FIG. 9 is sectional views of the photoreceptor 1 to explain read positions; FIG. 9A shows the background read positions when Cin is 20% or less shown in FIG. 2 and FIG. 9B shows the background read positions when Cin exceeds 20% shown in FIG. 8.

As shown in FIG. 9A, when the background of the photoreceptor 1 is read five times at 3-msec intervals, the read positions become the range of a part of the photoreceptor 1 (A). As shown in FIG. 9B, when the background of the photoreceptor 1 is read five times at 3-msec intervals for one round of the photoreceptor 1, the read positions become the range of one round of the photoreceptor 1 (B).

The ratio is found and the read positions are changed according to the Cin of the toner patch, whereby the toner patch can be detected considering the sensor output fluctuation effect caused by temperature, etc., and the background effect of the photoreceptor 1.

Figure 10:
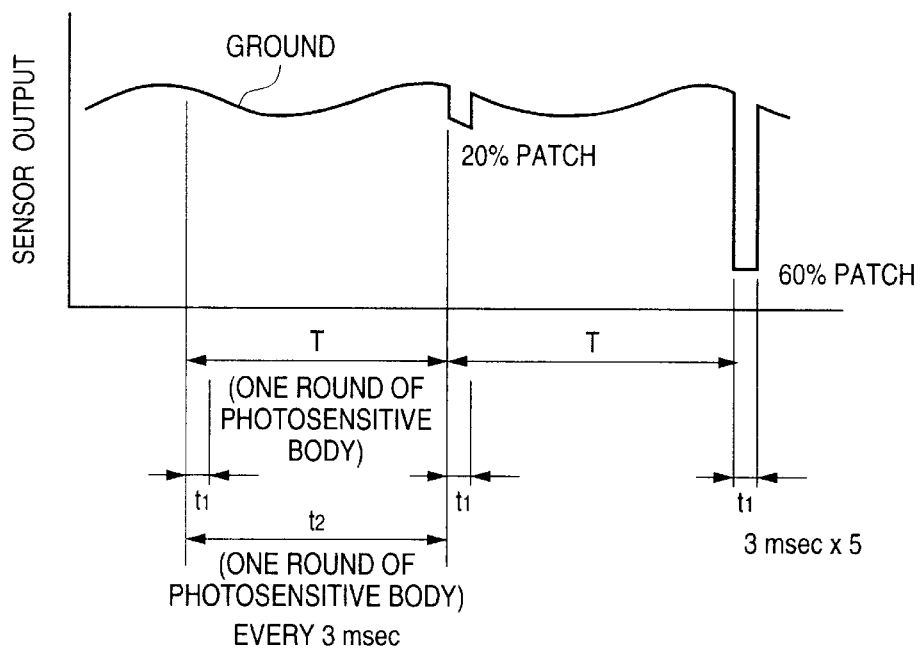
FIG. 10 is an illustration to explain sensor output (No.1)

FIG. 10 is an illustration to explain sensor output when toner patch and background are read. That is, in the first embodiment, when Cin is 20% or less (for example, 20%), reflected light from the background and reflected light from the toner patch are read at time t1 (namely, 3 msec×5); when Cin exceeds 20% (for example, 60%), reflected light from the background is read at time t2, namely, at 3-msec intervals for one round of the photoreceptor and reflected light from the toner patch is read at time t1 (namely, 3 msec×5). The reflected light from the toner patch at each concentration is read at the same position in synchronization with the cycle of one round of the photoreceptor, T.

The reason why the concentration in each Cin at the image formation time can be detected with high accuracy by changing the detection method in response to the Cin as described above is as follows:

(1) The background of the photoreceptor 1 has a large effect on a toner patch with low Cin, but has a small effect on a toner patch with high Cin.

(2) The background detection value varies depending on the read position because of the effect of reflection factor unevenness.

(3) The temperature dependency of the detection means made of the photoelectric sensor can be eliminated by using the ratio between the toner patch concentration detection value and the photoreceptor background detection value.

Therefore, the detection position of a toner patch with low Cin is synchronized with the detection position of the background of the photoreceptor 1, whereby the toner patch concentration detection accuracy in each Cin at the image forming can be raised. Since a toner patch with large Cin is hard to be affected by the background, an average of the background of the whole photoreceptor 1 is found, whereby the background effect is eliminated and the detection accuracy can be raised.

Figure 11:
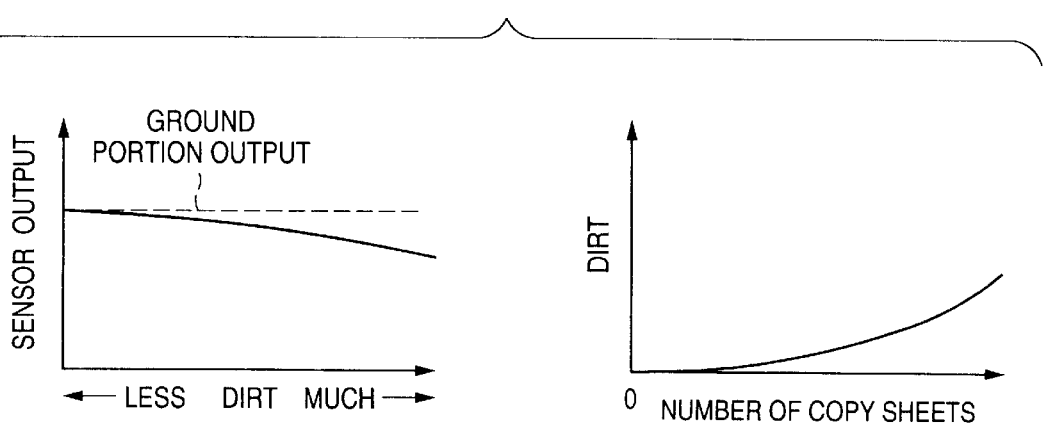
FIG. 11 is graphs to show output value change as a sensor becomes dirty.
Figure 13:
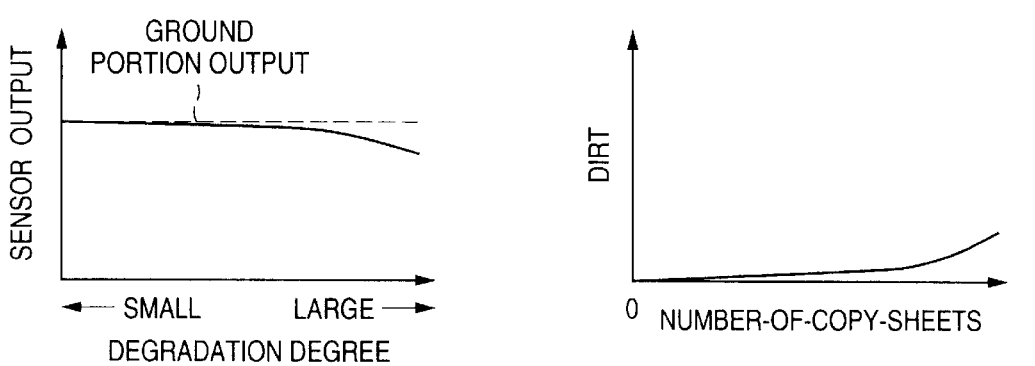
FIG. 13 is graphs to show output value change caused by degradation scratch.

As shown in FIGS. 11 and 13, the detection values also change with dirt of the photoelectric sensor, a scratch on the background of a detected substance, and environment. Dirt of the photoelectric sensor and scratches on the background of a detected substance grow with an increase in the number of copy volume (see the right graph of FIGS. 11 and 13).

They are sensed and corrected according to the cumulative count of the number of copy volume, whereby the detection accuracy can be improved.

Figure 12:
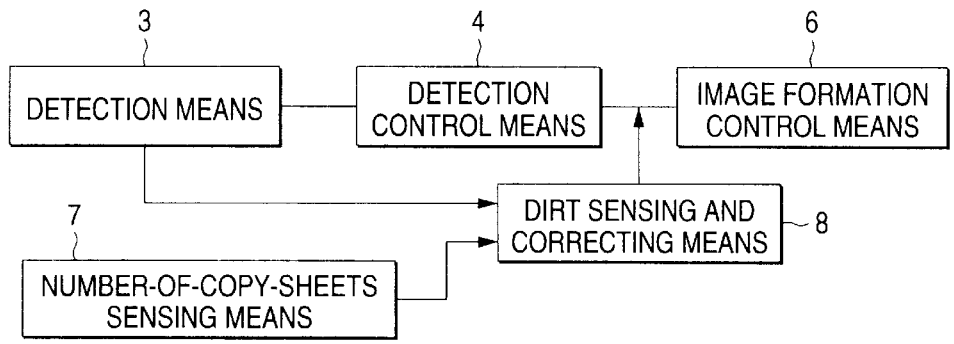
FIG. 12 is a block diagram to show a function of correcting detection value change caused by dirt of a sensor.

FIG. 12 is a block diagram to explain a function of correcting detection value change caused by dirt of the photoelectric sensor. That is, the function is provided by number-of-copy-sheets sensing means 7 and dirt sensing and correcting means 8 in addition to detection means 3, detection control means 4, and image forming control means 6 corresponding to those shown in FIG. 1.

In the function, when the number-of-copy-sheets sensing means 7 senses that a predetermined number of sheets have been copied, a correction start signal is sent to the dirt sensing and correcting means 8, which then makes a correction to the detection value provided by the detection means 3, whereby the detection value change effect caused by dirt of the photoelectric sensor can be removed for improving the detection accuracy.

Figure 14:
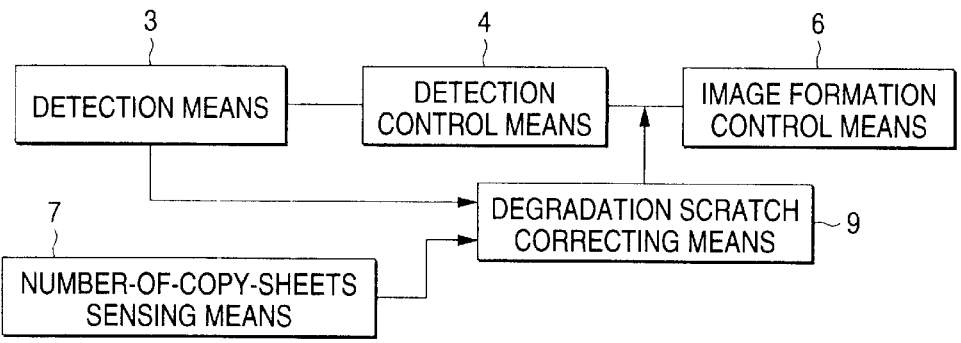
FIG. 14 is a block diagram to show a function of correcting detection value change caused by degradation scratch.

FIG. 14 is a block diagram to show a function of correcting detection value change caused by a scratch on the background of a detected substance. The function is provided by number-of-copy-sheets sensing means 7 and degradation scratch correcting means 9 in addition to detection means 3, detection control means 4, and image forming control means 6 corresponding to those shown in FIG. 1.

In the function like the function shown in FIG. 12, when the number-of-copy-sheets sensing means 7 senses that a predetermined number of sheets have been copied, a correction start signal is sent to the degradation scratch correcting means 9, which then makes a correction to the detection value provided by the detection means 3, whereby the detection value change effect caused by the scratch on the background of the detected substance can be removed for improving the detection accuracy.

In addition, temperature or humidity may be measured so that a correction is made to the detection value provided by the detection means 3 according to the temperature or humidity measurement value, whereby if the detection value of the detection means 3 changes due to the temperature or humidity effect, the change component can be removed for executing highly accurate detection.

Next, concentration detection processing for each Cin in the image forming apparatus of the first embodiment will be discussed with reference to FIG. 15, a flowchart. The flowchart assumes that when Cin is low, it is 20% and that when Cin is high, it is 60%.

First, when the image forming apparatus is shipped or is started, the reflected light quantity on the background of one round of the photoreceptor 1 is detected at step S101. The detection positions and the detection values are stored at step S102 and the detection values are averaged and the result is stored as Vc0 at step S103. The reflected light quantity on the background of one round of the photoreceptor 1 is detected at the shipment or start time, whereby it needs not be detected at the image formation request time (recording job start time) and the processing time can be shortened.

Next, when a recording job is started, the background of the photoreceptor 1 at the toner patch preparation position is detected five times every 3 msec, the detection values are averaged, and the result is set to Vc1 at step S104. Next, whether or not the read timing is 20% toner patch read timing is checked at step S105. If the read timing is 20% toner patch read timing, control goes to step S106; otherwise, control goes to step S108.

If the read timing is 20% toner patch read timing, 20% toner patch is detected five times every 3 msec, the detection values are averaged, and the result is set to Vp20 at step S106. The ratio between the Vp20 and Vc1 is calculated and Radc-20=(Vp20/Vc1)×200 is adopted as the toner patch concentration sensing result when Cin is 20% at step S107.

Thus, for the toner patch with low Cin, the background at the same position as the toner patch preparation position is detected, whereby the detection value effect of the photoelectric sensor caused by eccentricity of the photoreceptor, etc., and the background effect can be removed.

If the read timing is not 20% toner patch read timing, whether or not it is 60% toner patch read timing is checked at step S108. If the read timing is 60% toner patch read timing, control goes to step S109; otherwise, control returns to step S105.

If the read timing is 60% toner patch read timing, 60% toner patch is detected five times every 3 msec, the detection values are averaged, and the result is set to Vp60 at step S109. The ratio between the Vp60 and the Vc0 is calculated and Radc-60=(Vp60/Vc0)×200 is adopted as the toner patch concentration sensing result when Cin is 60% at step S110.

Thus, since the toner patch with high Cin is hard to receive the background effect, the average at the detection time of the background of one round of the photoreceptor read previously (at the shipment or start time) is used to execute calculation, whereby the time can be shorted and moreover the detection value effect of the photoelectric sensor caused by eccentricity of the photoreceptor 1, etc., can be removed.

In the first embodiment, a read error caused by the background effect of the photoreceptor can be decreased and when Cin is high, the background patch may be read only once when image forming apparatus is shipped or started, so that FCOT (First Copy Out Time) can be shortened.

Figure 18:
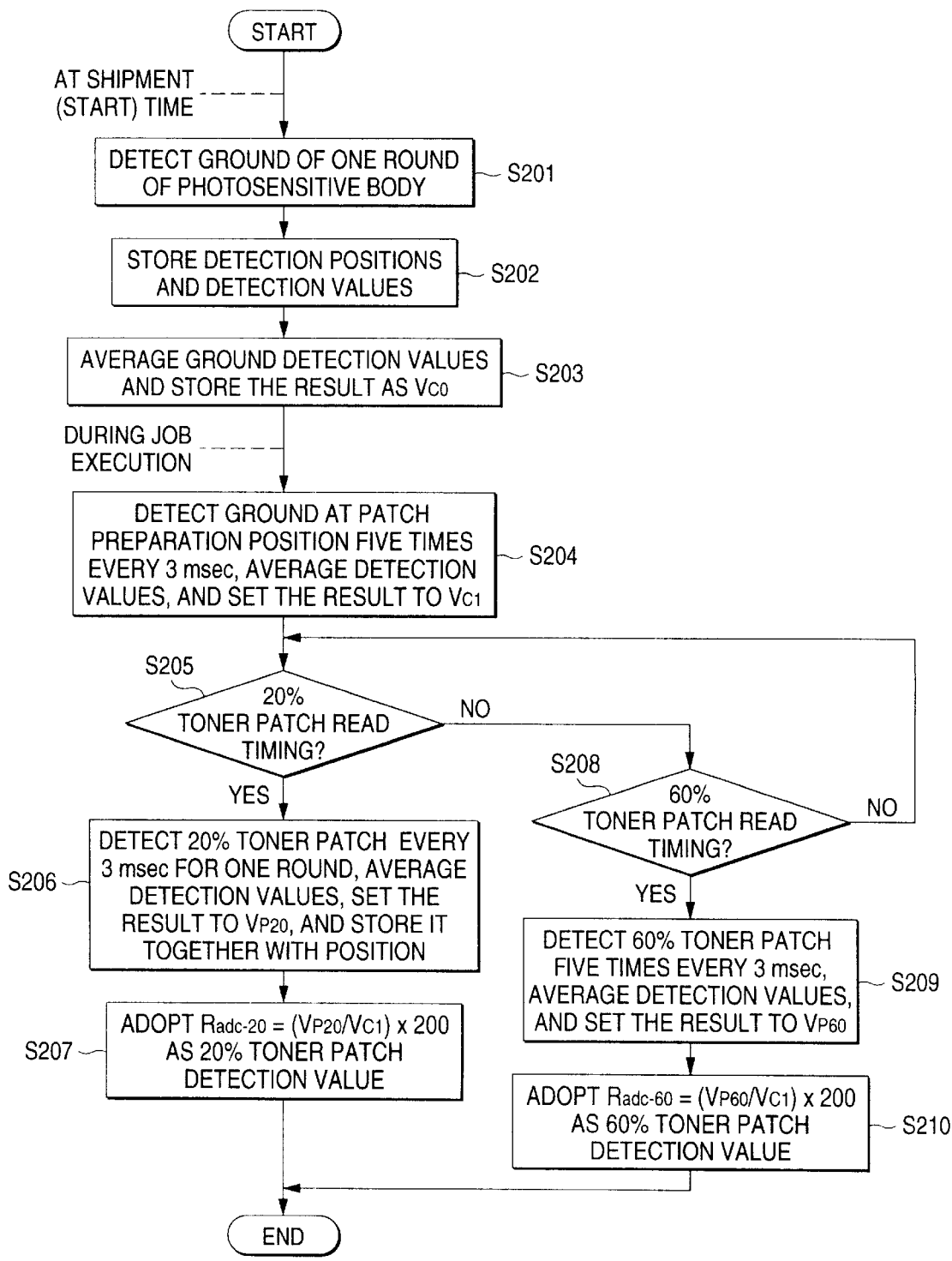
FIG. 18 is a detection processing flowchart (No.2)

Next, a modified example of the first embodiment will be discussed. FIG. 16 is a table to explain the modified example of the first embodiment. FIG. 17 is an illustration to explain a storage state in a memory. FIG. 18 is a detection processing flowchart.

Like the first embodiment, the modified example is also characterized by the fact that a reflected light read method from the background of the photoreceptor 1 and a reflected light read method from a toner patch are changed in response to Cin, for example, low Cin (20% or less Cin) or high Cin (exceeding 20%). The modified example differs from the first embodiment in that when Cin is low, the background of one round of the photoreceptor 1 is read at 3-msec intervals.

In the modified example of the first embodiment, the detection values are averaged, the toner patch concentration detection result is calculated according to the ratio between toner patch and background detection averages, and the image forming apparatus is controlled based on the detection result, whereby the concentration in the image forming apparatus such as a color copier can be controlled with high accuracy. When Cin is low, the toner patch concentration detection values and detection positions are stored in a memory in a correspondence with the addresses in the memory, as shown in FIG. 17.

In the modified example of the first embodiment, when Cin is low, the background of the photoreceptor 1 is detected at 3-msec intervals for one round of the photoreceptor 1 and addresses are provided in a one-to-one correspondence with pairs of read background detection positions and detection values corresponding thereto for storage in the memory.

At the calculation time, the background detection values matching the toner patch detection positions are read from the memory and the toner patch concentration detection result is obtained, whereby the need for reading the background for each job as in the first embodiment is eliminated and the processing time can be shortened.

Figure 15:
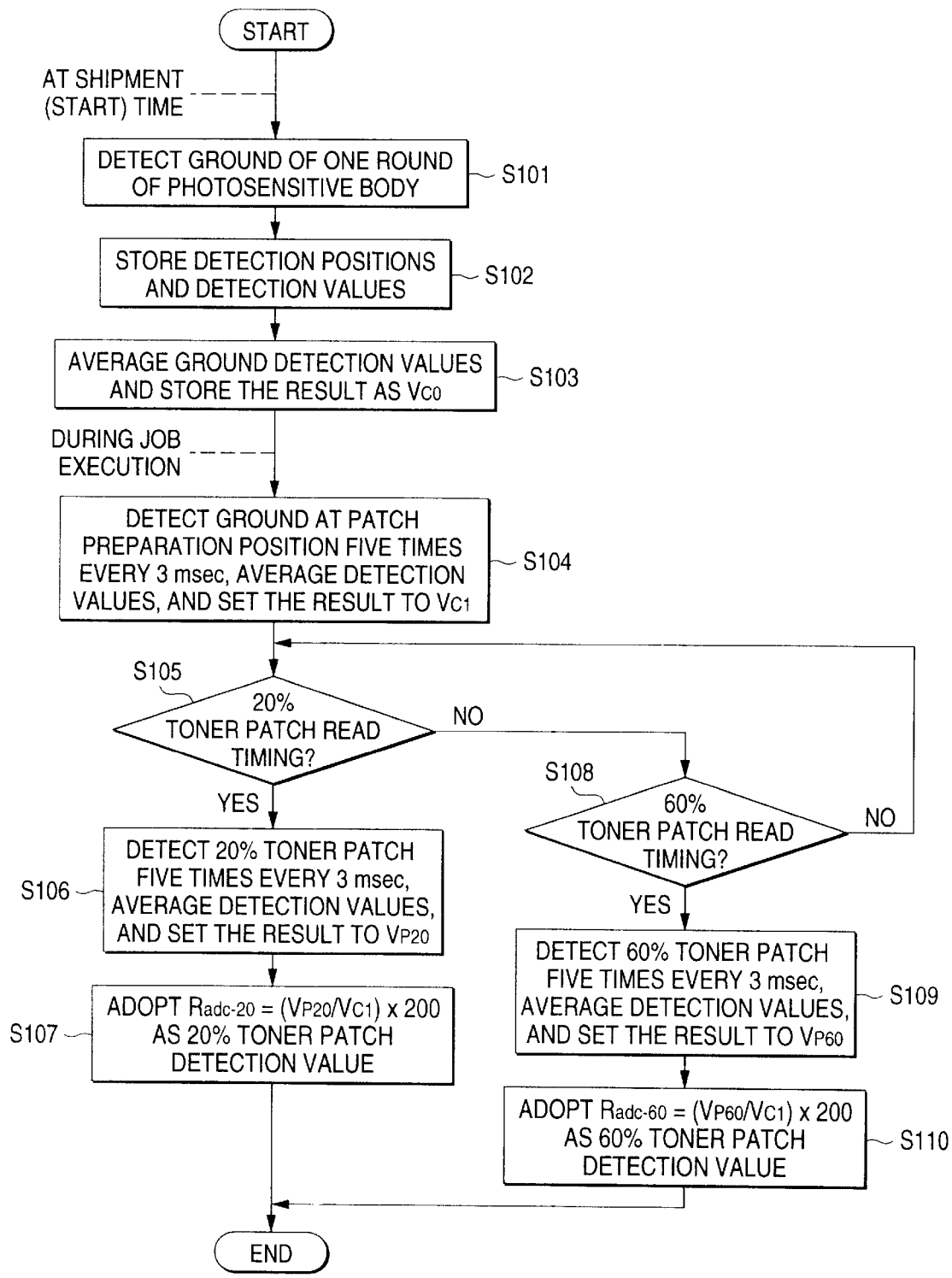
FIG. 15 is a detection processing flowchart (No.1)

In a flowchart shown in FIG. 18, steps S201–S205 and S207–S210 are the same as steps S101–S105 and S107–S110 in the detection processing flowchart of the first embodiment shown in FIG. 15. This means that the first embodiment and its modified example differ in step S206 (S106).

At step S206, the reflected light from a 20% toner patch is read at 3-msec intervals for one round of the photoreceptor 1, average is set to Vp20, and each detection position and its corresponding detection value are stored in the memory in correspondence with a memory address (see FIG. 17), whereby when the toner patch detection value is calculated, the value stored in the memory can be used to eliminate the need for frequent read and shorten the image formation processing time.

Next, a second embodiment of the invention will be discussed. FIG. 19 is a table to explain the second embodiment of the invention. FIG. 20 is an illustration to explain sensor output.

Like the first embodiment, the second embodiment is also characterized by the fact that a reflected light read method from the background of a photoreceptor 1 and a reflected light read method from a toner patch are changed in response to Cin, for example, low Cin (20% or less Cin) or high Cin (exceeding 20%). The second embodiment differs from the first embodiment in that the toner patch detection position when Cin is high is any position on the photoreceptor 1.

In the second embodiment, when Cin is 20% or less, the background at the same position as the toner patch preparation position is read five times at 3-msec intervals for each job (image formation request) (time t1) and average Vc1 is calculated as the background read method. As the toner patch read method, toner patch at the same position as the background read position is read five times at 3-msec intervals (times t1), average Vp is calculated, and (Vp/Vc1)×200 is calculated to find a toner patch concentration detection value.

On the other hand, when Cin exceeds 20%, as the background read method, one round of the photoreceptor is read at 3-msec intervals (time t2) and average Vc0 is calculated. The Vc0 is read only once at the shipment time of the image forming apparatus (or each time the image forming apparatus is started). As the toner patch read method, toner patch at any position on the photoreceptor 1 is read 10 times at 3-msec intervals (time t3), average Vp is calculated, and (Vp/Vc0)×200 is calculated to find a toner patch concentration detection value.

As shown in FIG. 20, in the second embodiment, when Cin is 20% or less (for example, 20%), reflected light from the background and reflected light from the toner patch are read at time t1 (namely, 3 msec×5); when Cin exceeds 20% (for example, 60%), reflected light from the background is read at time t2, namely, at 3-msec intervals for one round of the photoreceptor and reflected light from the toner patch is read at time t1 (namely, 3 msec×5).

The reflected light read position from the toner patch when Cin is 20% or less is synchronized with the cycle of one round of the photoreceptor, T. However, the reflected light read position from the toner patch when Cin exceeds 20% is any position on the photoreceptor 1.

In the second embodiment, a toner patch when Cin is high can be prepared anywhere without restriction. Thus, the background of the photoreceptor 1 is read 10 times at 3-msec intervals at any position of the photoreceptor 1, whereby the toner patch preparation frequency when Cin is high improves and CPM (Copy Per Minute) can be improved.

Figure 21:
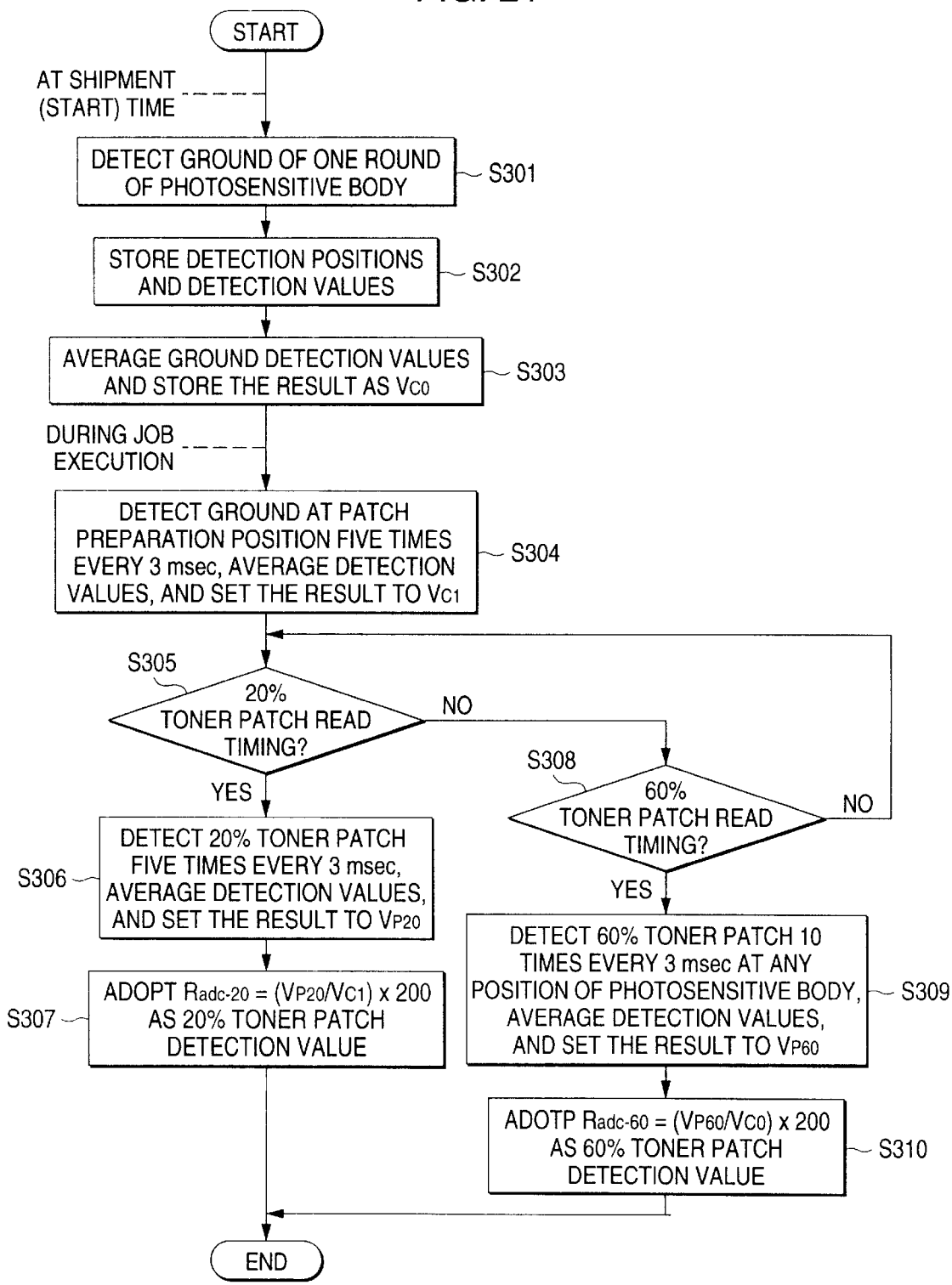
FIG. 21 is a detection processing flowchart (No.3)

In a detection processing flowchart of the second embodiment shown in FIG. 21, steps S301–S308 and S310 are the same as steps S101–S108 and S110 in the detection processing flowchart of the first embodiment shown in FIG. 15. This means that the first and second embodiments differ in step S309 (S109).

At step S309, a 60% toner patch is detected 10 times every 3 msec at any position of the photoreceptor 1, the detection values are averaged, and the result is set to Vp60.

Next, a third embodiment of the invention will be discussed. The third embodiment is characterized by the fact that when the ratio between toner patch and background detection averages is calculated when a toner patch concentration detection value is calculated in the first and second embodiments, the background detection average contribution percentage is changed in response to the gradation area percentage of the toner patch.

In addition to changing of the background detection average contribution percentage in response to the gradation area percentage of the toner image, the contribution percentage may be corrected in response to various conditions of a scratch on the background of a photoreceptor 1, dirt of detection means made of a photoelectric sensor, an environment of temperature, humidity, etc., and the like.

As specific means for changing the contribution percentage, a method using a predetermined expression and a method using a preset look-up table are available.

As the method using a predetermined expression, for example, the following expression is used:

Patch concentration detection value=(Vp [Cin])/(Vcn× Kn+VcALL×KALL)×200 where Kn=(1−(Cin/100), KALL=Cin/100, Cin is gradation area percentage at a predetermined toner patch, Vcn is read average of the background of a photoreceptor 1 for detecting the predetermined toner patch, and VcALL is read average of the background throughout all periphery of the photoreceptor in a state in which the photoreceptor is not dirty, for example, when the image forming apparatus containing the photoreceptor is shipped.

FIG. 22 is an illustration to show a look-up table. To use the expression explained above, the coefficient Kn and KALL for determining the background detection average contribution percentage change at constant rates as shown under the column "Expression." If the coefficients Kn and KALL are previously entered in table data in response to the gradation area percentage Cin as shown under the column "Look-up table," whereby the contribution percentage may be corrected in response to various conditions of a scratch on the background of the photoreceptor 1, dirt of detection means made of a photoelectric sensor, an environment of temperature, humidity, etc., and the like. Since actual empirical values are used to correct the contribution percentage, control accuracy is improved.

Thus, the toner patch concentration detection accuracy for each Cin can be improved without changing the toner patch detection position, etc. Since the background effect degree varies depending on the toner patch type, the background detection average contribution percentage is changed by setting the expression or look-up table values, whereby various toner patches can be detected with high accuracy and the concentration at the image formation time can be controlled accurately.

Next, a fourth embodiment of the invention will be discussed. The fourth embodiment is characterized by the fact that the toner patch preparation frequency is changed in response to the gradation area percentage of each toner patch. That is, as shown in FIG. 23, for example, if Cin is 20% or less, a toner patch with the Cin is prepared once every 10 copies at the continuous copy time; if Cin exceeds 20%, a toner patch with the Cin is prepared once every five copies at the continuous copy time.

FIG. 24 is a table to explain specific toner patch preparation frequencies. For example, if a copy job is to continuously copy 20 sheets, when the first sheet is copied, a 20% or less (for example, 20%) toner patch and a toner patch exceeding 20% (for example, a 60% toner patch) are prepared and reflected light on the toner patches are detected for detecting the toner patch concentration for copying the first sheet.

Then, the 20% or less toner patch is prepared once every 10 copies like the tenth sheet, the twentieth sheet, etc. On the other hand, the toner patch exceeding 20% is prepared once every five copies like the fifth sheet, the tenth sheet, the fifteenth sheet, the twentieth sheet, etc.

Since background unevenness fluctuation of a photoreceptor 1 is small in a single job, a toner patch with low Cin receives a small background effect and a toner patch with high Cin receives a large developing effect. Therefore, the toner patch preparation frequency with low Cin is made smaller than that with high Cin, whereby the toner consumption amount can be decreased while toner patch concentration detection control accuracy is provided. CPM (Copy Per Minute) can also be improved. It means the number of sheets that can be copied per minute. Normally, a dedicated patch preparation mode needs to be provided for preparing toner patches. If the patch preparation frequency lessens, the number of times the dedicated patch preparation mode is entered decreases, thus the CPM can be improved.

Next, a fifth embodiment of the invention will be discussed. The fifth embodiment is characterized by the fact that the sampling interval and the number of samplings at each detection are changed in response to the gradation area percentage of a toner patch and that moving average is changed.

For example, as a toner patch has a larger gradation area percentage, the number of samplings of reflected light from the toner patch is lessened, the sampling interval is widened, and the moving average is decreased.

Thus, the toner consumption amount can be decreased while toner patch concentration detection accuracy is provided. Further, CPM (Copy Per Minute) can be improved.

In the embodiments, the photosensitive bodies 1 are used as image supports. However, the invention is not limited to them and can also be applied to image forming apparatuses using intermediate transfer bodies.

Figure 25:
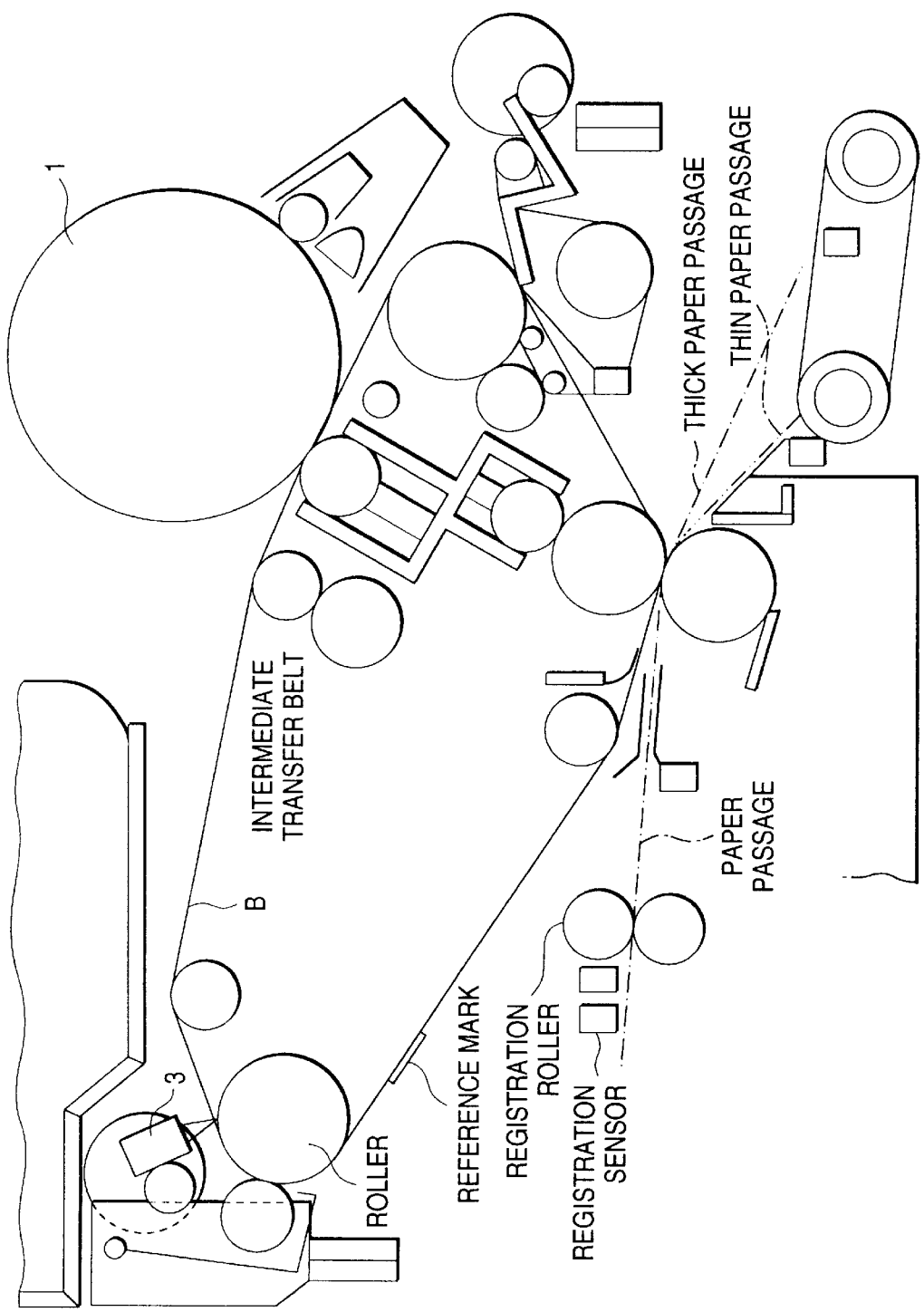
FIG. 25 is a schematic diagram to show the configuration of an image forming apparatus comprising an intermediate transfer belt.

FIG. 25 is a schematic diagram to show the configuration of an image forming apparatus comprising an intermediate transfer belt of an intermediate transfer body. The image forming apparatus transfers a toner image formed on a photoreceptor 1 to an intermediate transfer belt B, then transfers the toner image on the intermediate transfer belt B to paper at a position coming in contact with a paper passage.

Since the image forming apparatus forms a toner patch on the intermediate transfer belt B, detection means 3 is placed in the vicinity of a position facing a roller supporting the intermediate transfer belt B and reflected light from the background of the intermediate transfer belt B and reflected light from the toner patch are detected at the position. That is, the concentration after transfer in a state closer to the concentration on copy paper to be stabilized can be detected and accuracy can be improved as compared with the case where a toner patch is prepared on the photoreceptor.

Figure 26:
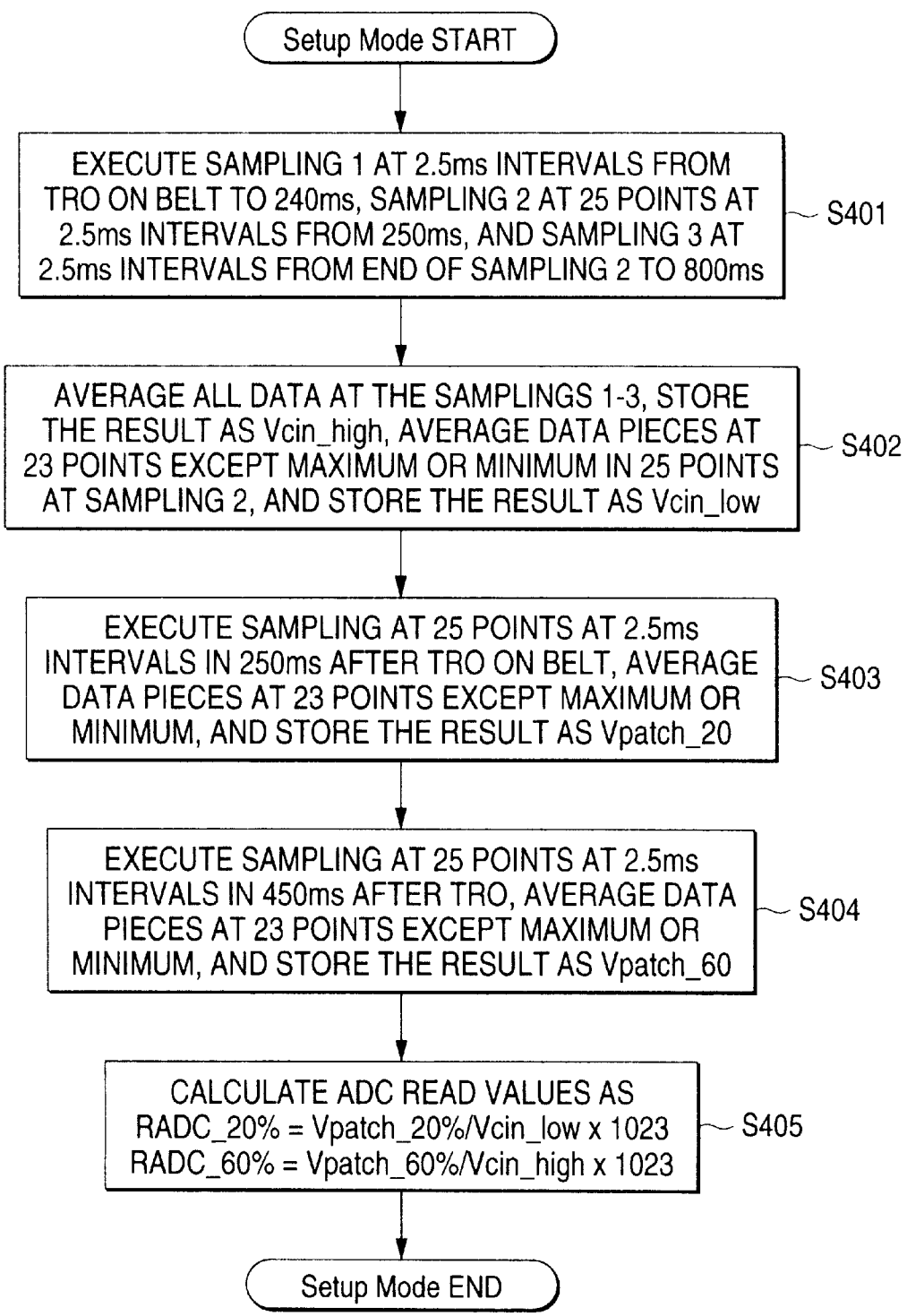
FIG. 26 is a flowchart to explain a toner patch detection procedure.

FIG. 26 is a flowchart to explain a toner patch detection procedure in the image forming apparatus comprising an intermediate transfer belt. First, at step S401, when the system is started or set up or a job is started at a predetermined interval (for example, every four hours), reflected light from the background of the intermediate transfer belt is detected at 2.5-ms intervals from a reference position (TR0) on the intermediate transfer belt to 240 ms (sampling 1), reflected light from the background at 25 points is detected at 2.5-ms intervals from 250 ms (sampling 2), and reflected light from the background is detected at 2.5-ms intervals from the end of sampling 2 to 800 ms (sampling 3).

Next, at step S402, all data at the samplings 1–3 detected at step S401 is averaged, the result is stored as Vcln-high, the data pieces at 23 points except the maximum or the minimum in 25 points at the sampling 2 are averaged, and the result is stored as Vcln-low.

Figure 27:
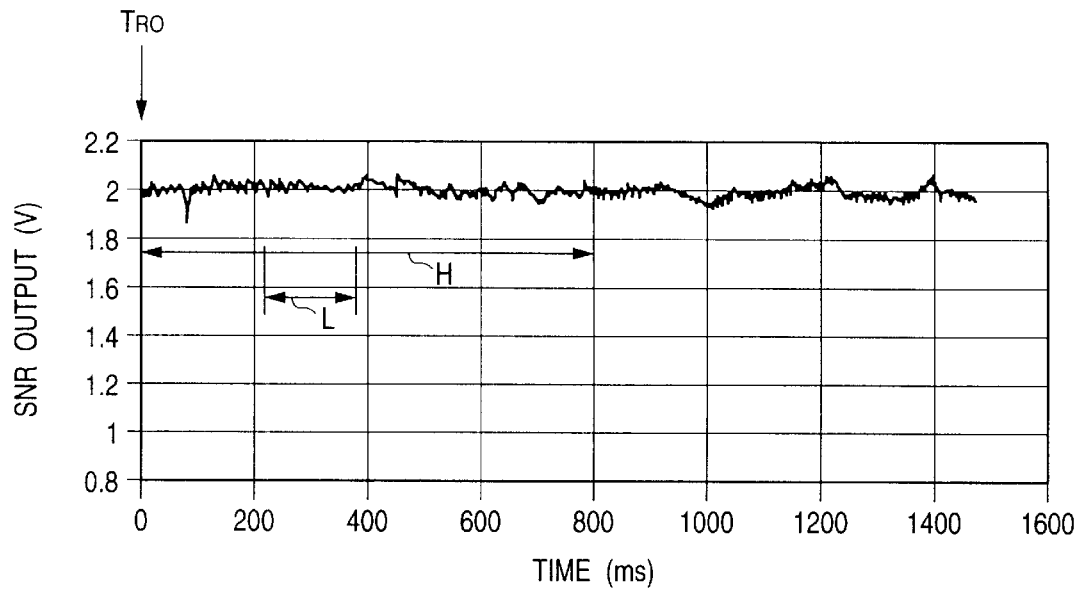
FIG. 27 is a chart to show the relationship of background detection values to the move time.

FIG. 27 is a chart to show the relationship of background detection values to the move time from the reference position (TR0) of the intermediate transfer belt. That is, at step S402, all data in the portion indicated by H in the figure is averaged, the result is set to Vcln-high, the data pieces at 23 points except the maximum or the minimum in the portion indicated by L in the figure are averaged, and the result is stored as Vcln-low. Particularly, the portion indicated by L in the figure corresponds to the portion forming a toner patch described later. An optical sensor (not shown) placed at the same later position as detection means 3 detects a reference mark in FIG. 25, whereby the TR0 is sensed. The reference mark uses aluminum tape, etc.

Next, at step S403, a toner patch with 20% Cin is formed at 25 points at 2.5-ms intervals in 250 ms after the reference position (TR0) of the intermediate transfer belt and reflected light from the toner patch is detected. The data pieces at 23 points except the maximum or the minimum of the detection values are averaged and the result is stored as Vpatch-20.

Next, at step S404, a toner patch with 60% Cin is formed at 25 points at 2.5-ms intervals in 450 ms after the reference position (TR0) of the intermediate transfer belt and reflected light from the toner patch is detected. The data pieces at 23 points except the maximum or the minimum of the detection values are averaged and the result is stored as Vpatch-60.

Figure 28:
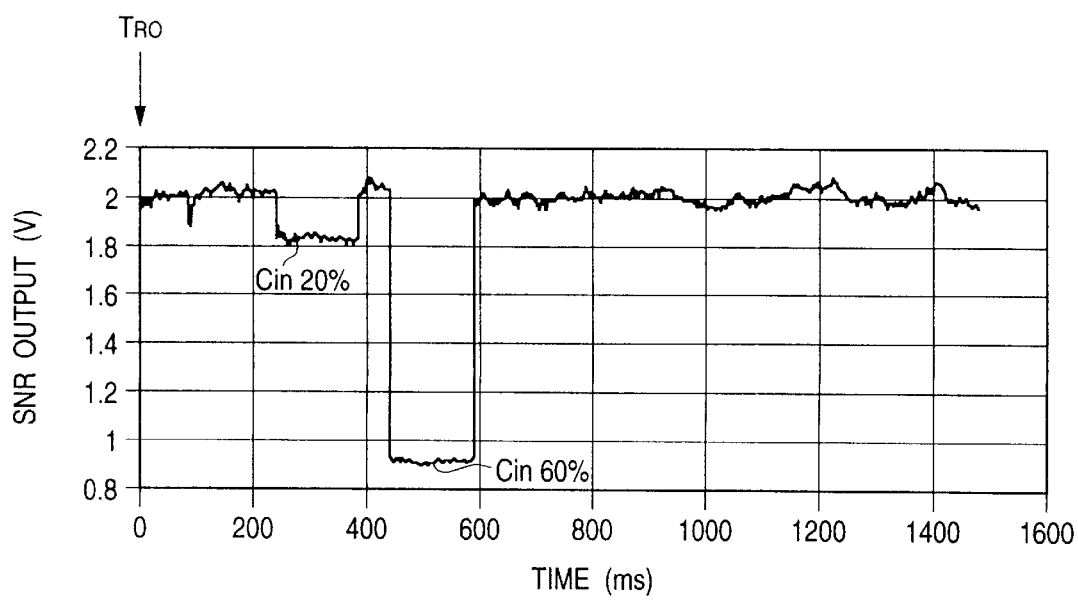
FIG. 28 is a chart to show the relationship of toner patch detection values to the move time.

FIG. 28 is a chart to show the relationship of toner patch concentration detection values when Cin is 20% and 60% to the move time from the reference position (TR0) of the intermediate transfer belt. Thus, when Cin is 20%, a toner patch is formed at the same position as L shown in FIG. 27 and when Cin is 60%, a toner patch is formed in the range of H shown in FIG. 27, then reflected light rays from the toner patches are detected.

After the concentrations of the two toner patches are detected, at step S405, the concentration detection value of the toner patch with 20% Cin is calculated as Radc-20=Vpatch-20/Vcln-low×1023 and the concentration detection value of the toner patch with 60% Cin is calculated as Radc-60=Vpatch-60/Vcln-low×1023. Multiplication by 1023 is executed to process the result as 10-bit data for improving the detection accuracy as compared with processing the result as 8-bit data.

That is, for the toner patch with 20% Cin, the reflected light from the background at the same position as and of the same size as the toner patch is read as Vcln-low and the ratio between Vcln-low and Vpatch-20 is calculated to provide the detection value.

For the toner patch with 60% Cin, the reflected light from the background of one third a round portion of the intermediate transfer belt containing the toner patch preparation position is read as Vcln-high and the ratio between Vcln-high and Vpatch-60 is calculated to provide the detection value.

The purpose of calculating the ratio between Vcln and Vpatch in each Cin is to correct the background effect and the emission light quantity fluctuation of the photoelectric sensor (dirt and temperature characteristic). That is, the background effect appears as high-frequency noise and the emission light quantity fluctuation appears as a sensor output level shift. These effects can be corrected by calculating the ration between Vcln and Vpatch.

Since the background effect of the intermediate transfer belt is large when Cin is low, the background portion at the same position as the toner patch preparation position and of the same size as the toner patch is detected as Vcln and the ratio between Vpatch and Vcln is calculated, whereby the background effect and the sensor output level shift can be corrected.

Further, when Cin is high, the background effect of the intermediate transfer belt is small, the background of one third or more a round of the intermediate transfer belt is detected, detection value average is set to Vcln, and the ratio between Vpatch and Vcln is calculated, whereby high-frequency noise caused by the background effect and sensor output fluctuation caused by vibration of the belt, etc., can be corrected.

Figure 29:
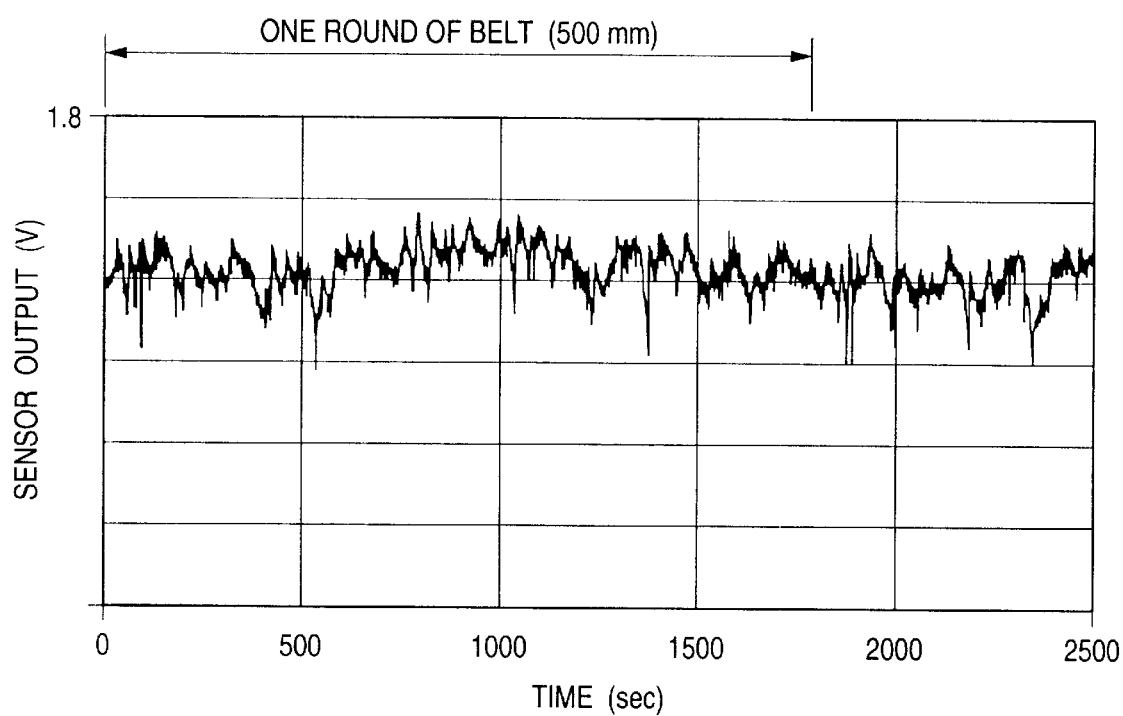
FIG. 29 is a chart to show an example of the belt background detection result.
Figure 30:
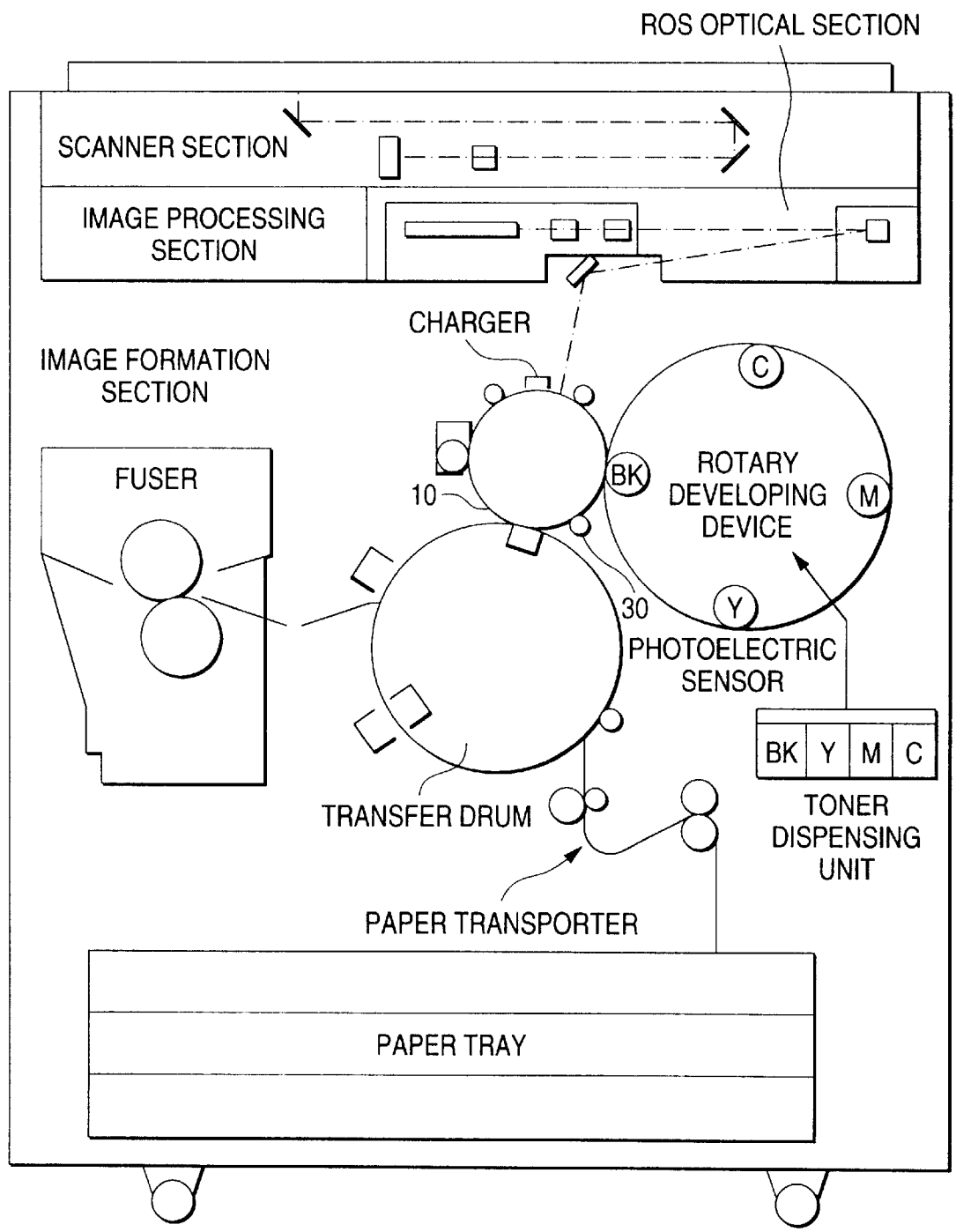
FIG. 30 is a schematic drawing to show a general configuration of a color copier.
Figure 31:
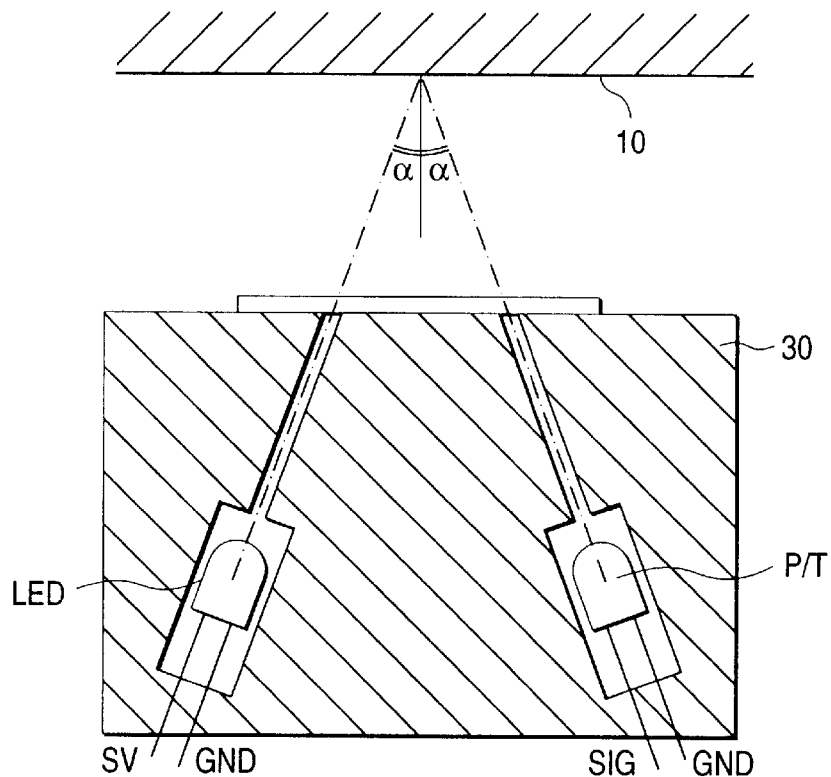
FIG. 31 is a sectional view of a photoelectric sensor.

For example, in the large forming apparatus with process speed 200 mm/sec or more and belt round length 500 mm, many undulations occur in the belt face. FIG. 29 is a chart to show an example of the background detection result in the image forming apparatus with process speed 200 mm/sec or more and belt round length 500 mm. In this example, three large undulations occur. If the background of about one third a round of the belt is detected, at least one whole undulation can be detected and detection accuracy does not lower as compared with detecting the background of a full round of the belt.

When the background of about one third a round of the belt is thus detected, the detection time can be shortened as compared with detecting the background of a full round of the belt. Further, control accuracy improves because of the toner patch also containing transfer fluctuation as compared with preparing a toner patch on the photoreceptor.

If a large number of toner patches are prepared (for example, Cin is 20%, 40%, 60%, and 80%), the contribution percentage of Vcln reading the background of the intermediate transfer belt in response to each Cin is changed. That is, a predetermined expression or a preset look-up table is used to change the contribution percentage, as described early.

In this case, the reflected light detection values from the background read over the full length of the intermediate transfer belt are averaged, the result is set to Vcall, a predetermined expression or a look-up table is used to find the contribution percentage of Vcall responsive to each Cin, and Vpatch of each Cin is corrected, whereby even if a large number of toner patches are prepared, the background effect degree responsive to each Cin can be considered to obtain toner patch detection values with good accuracy.

As we have discussed, in the image forming apparatus and its control method according to the invention, the detection method of the reflected light quantities from the background of the image support and the toner patch is controlled depending on whether Cin is low or high by the patch preparation means. Thus, the toner patch concentration in each Cin can be detected with good accuracy and tone production control, toner concentration control, and the like of the image forming apparatus are performed based on the detection result, so that the concentration in the image forming apparatus such a color copier can be controlled with high accuracy.

What is claimed is:

1. An image forming apparatus comprising:

patch preparation means for preparing a toner patch including a predetermined gradation area percentage on an image support to detect a developing concentration;

an optical sensor for detecting reflected light from a background of the image support and reflected light from the toner patch prepared on the image support; and control means for controlling a reflected light detection method of the optical sensor in response to the gradation area percentage of the toner patch prepared by said patch preparation means, whereby said control means controls the reflected light detection method so that if the gradation area percentage of the toner patch is smaller than a predetermined setup value, a reflected light detection position of the optical sensor from the toner patch is made the same as the reflected light detection position of the optical sensor from the background of the image support, and that if the gradation area percentage of the toner patch is larger than the predetermined setup value, the reflected light detection position of the optical sensor from the toner patch is made different from the reflected light detection position of the optical sensor from the background of the image support.

2. The image forming apparatus of claim 1, wherein said control means controls the detection method so that the optical sensor detects reflected light from the toner patch whose formation position on the image support is changed in response to the gradation area percentage of the toner patch.

3. The image forming apparatus of claim 1, wherein said control means controls the detection method so as to change a reflected light detection position of the optical sensor from the background of the image support in response to the gradation area percentage of the toner patch.

4. The image forming apparatus of claim 3, wherein said control means controls the detection method so that if the gradation area percentage of the toner patch is larger than a predetermined setup value, the reflected light from the background of the image support is detected on a full round of the image support, detection values are averaged, and the result is output as the detection result.

5. The image forming apparatus of claim 4, wherein said control means outputs the detection result when said image forming apparatus is started.

6. The image forming apparatus of claim 4, wherein said control means outputs the detection result when an image formation request is made.

7. The image forming apparatus of claim 1, wherein said control means detects at least one of a scratch on the background of the image support, dirt of the optical sensor, temperature, and humidity and correct a detection value of the reflected light.

8. The image forming apparatus of claim 1, wherein said control means controls the detection method so as to change each sampling method when the optical sensor detects the reflected light from the toner patch and the reflected light from the background of the image support.

9. The image forming apparatus of claim 8, wherein said control means changes the sampling method so as to decrease the number of samplings of the reflected light from the toner patch as the toner patch has a larger gradation area percentage.

10. The image forming apparatus of claim 8, wherein said control means changes the sampling method so as to widen a sampling interval of the reflected light from the toner patch as the toner patch has a larger gradation area percentage.

11. The image forming apparatus of claim 1, wherein said control means controls the detection method so that the optical sensor detects the reflected light from the toner patch whose preparation frequency on the image support is changed in response to the gradation area percentage of the toner patch.

12. The image forming apparatus of claim 11, wherein said control means controls the detection method so that the optical sensor detects the reflected light from the toner patch whose preparation frequency is increased as the toner patch has a larger gradation area percentage.

13. The image forming apparatus of claim 1, wherein said patch preparation means prepares a toner patch with a predetermined gradation area percentage in response to the number of toner lines formed on the image support.

14. The image forming apparatus of claim 1, wherein said patch preparation means prepares a toner patch with a predetermined gradation area percentage in response to thickness of each toner line formed on the image support.

15. The image forming apparatus of claim 1, wherein said patch preparation means prepares a toner patch with a predetermined gradation area percentage in response to the number of toner dots formed on the image support.

16. The image forming apparatus of claim 1, wherein said patch preparation means prepares a toner patch with a predetermined gradation area percentage in response to thickness of each toner dot formed on the image support.

17. The image forming apparatus of claim 1, wherein said control means controls the detection method so that as the toner patch has a larger gradation area percentage, detection contribution percentage of the reflected light from the background of the image support is lessened.

18. The image forming apparatus of claim 17, wherein said control means calculates the detection contribution percentage of the reflected light from the background of the image support based on a predetermined expression.

19. The image forming apparatus of claim 17, wherein said control means calculates the detection contribution percentage of the reflected light from the background of the image support based on predetermined table data.

20. The image forming apparatus of claim 1, wherein said control means controls the detection method so as to change a moving average method in detection of the reflected light from the toner patch and the reflected light from the background of the image support in response to the gradation area percentage of the toner patch.

21. The image forming apparatus of claim 20, wherein said control means changes the moving average method so as to lessen the number of moving averages as the toner patch has a larger gradation area percentage.

22. The image forming apparatus of claim 1, wherein said image support is made of a belt.

23. The image forming apparatus of claim 22, wherein said control means detects reflected light from the background of said belt over one third a round of said belt containing the toner patch preparation position if process speed in image formation is 200 mm/sec or more and said belt has a round length of 500 mm or more.

24. The image forming apparatus of claim 1, further comprising:
storage means for storing reflected light detection values from the background of the image support and reflected light detection positions on the background of the image support in a one-to-one correspondence with each other.

25. An image forming apparatus control method of preparing a toner patch including a predetermined gradation area percentage on an image support and controlling a developing concentration based on reflected light from the toner patch, the method comprising the steps of:
detecting reflected light from a background of the image support according to a detection method responsive to the gradation area percentage of the toner patch;
preparing the toner patch including the predetermined gradation area percentage on the image support at predetermined timing;
detecting reflected light from the toner patch according to the detection method responsive to the gradation area percentage of the toner patch; and
controlling the developing concentration based on the operation results on detection values of the reflected light from the background of the image support and the reflected light from the toner patch such that if the gradation area percentage of the toner patch is smaller than a predetermined setup value, a reflected light detection position of the optical sensor from the toner patch is made the same as a reflected light detection position of the optical sensor from the background of the image support, and that if the gradation area percentage of the toner patch is larger than the predetermined setup value, the reflected light detection position of the optical sensor from the toner patch is made different from the reflected light detection position of the optical sensor from the background of the image support.

26. An image forming apparatus control method of preparing a toner patch including a predetermined gradation area percentage on an image support and controlling a developing concentration based on reflected light from the toner patch, the method comprising the steps of:
detecting reflected light from a background of the image support according to a sampling method responsive to the gradation area percentage of the toner patch;
preparing the toner patch including the predetermined gradation area percentage on the image support at predetermined timing;
detecting reflected light from the toner patch according to the sampling method responsive to the gradation area percentage of the toner patch; and
controlling the developing concentration based on the operation result on detection values of the reflected light from the background of the image support and the reflected light from the toner patch such that if the gradation area percentage of the toner patch is smaller than a predetermined setup value, a reflected light detection position of the optical sensor from the toner patch is made the same as a reflected light detection position of the optical sensor from the background of the image support, and that if the gradation area percentage of the toner patch is larger than the predetermined setup value, the reflected light detection position of the optical sensor from the toner patch is made different from the reflected light detection position of the optical sensor from the background of the image support.

27. An image forming apparatus control method of preparing a toner patch including a predetermined gradation area percentage on an image support and controlling a developing concentration based on reflected light from the toner patch, said method comprising the steps of:

detecting first reflected light from a background of the image support when the image forming apparatus is started;

detecting second reflected light from the background of the image support when an image formation request is made; and if the gradation area percentage of the toner patch prepared on the image support is larger than a predetermined setup value, controlling the developing concentration based on the operation result on reflected light from the toner patch and the first reflected light and if the gradation area percentage of the toner patch prepared on the image support is smaller than the predetermined setup value, controlling the developing concentration based on the operation result on reflected light from the toner patch and the second reflected light.

* * * * *